(12) United States Patent
Namikata

(10) Patent No.: US 7,583,420 B2
(45) Date of Patent: Sep. 1, 2009

(54) IMAGE PROCESSING METHOD AND APPARATUS

(75) Inventor: Takeshi Namikata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 11/467,621

(22) Filed: Aug. 28, 2006

(65) Prior Publication Data

US 2006/0285137 A1 Dec. 21, 2006

Related U.S. Application Data

(62) Division of application No. 10/180,132, filed on Jun. 27, 2002, now Pat. No. 7,206,100.

(30) Foreign Application Priority Data

| Jul. 2, 2001 | (JP) | ............................. 2001-201242 |
| Sep. 14, 2001 | (JP) | ............................. 2001-280384 |
| Oct. 15, 2001 | (JP) | ............................. 2001-317047 |

(51) Int. Cl.
*G03F 3/08* (2006.01)
*H04N 1/46* (2006.01)
*G06K 9/00* (2006.01)

(52) U.S. Cl. ........................ 358/518; 358/1.9; 358/504; 358/523; 382/162; 382/167

(58) Field of Classification Search ................. 358/518, 358/502, 504, 1.9, 1.2, 520, 523, 536, 456, 358/406, 534, 529, 3.23, 3.09; 382/162, 382/167, 299; 399/9; 347/43
See application file for complete search history.

(56) References Cited

U.S. PATENT DOCUMENTS

| 4,959,659 | A | * | 9/1990 | Sasaki et al. .................... 347/43 |
| 5,793,501 | A | | 8/1998 | Murakami .................... 358/520 |
| 5,875,260 | A | | 2/1999 | Ohta ........................... 382/162 |
| 5,996,003 | A | | 11/1999 | Namikata et al. ............ 709/205 |
| 5,999,703 | A | * | 12/1999 | Schwartz et al. .............. 358/1.9 |
| 6,072,589 | A | * | 6/2000 | Rozzi .......................... 358/1.9 |
| 6,160,635 | A | | 12/2000 | Usami ......................... 358/1.9 |
| 6,406,117 | B2 | * | 6/2002 | Kuno et al. .................... 347/15 |
| 6,822,757 | B1 | * | 11/2004 | Usami et al. .................. 358/1.9 |
| 7,012,714 | B2 | | 3/2006 | Higashikata et al. .......... 358/1.9 |
| 2002/0031258 | A1 | | 3/2002 | Namikata .................... 382/165 |

(Continued)

FOREIGN PATENT DOCUMENTS

JP         08-130655         5/1996

(Continued)

*Primary Examiner*—Edward L Coles
*Assistant Examiner*—Charlotte M Baker
(74) *Attorney, Agent, or Firm*—Fitzpatrick, Cella, Harper & Scinto

(57) ABSTRACT

It is difficult to adjust a black plate while maintaining accurate color reproduction in a color printer that forms an image using C, M, Y, and K color agents. Upon generating a conversion condition used to convert a signal on a uniform color space into a CMYK signal which depends on a printer, the signal on the uniform color space according to a colorimetric value is temporarily converted into an RGB signal, and the RGB signal is then converted into a CMYK signal. After that, a black amount adjustment unit adjusts a K value using a black amount adjustment function based on a user's instruction.

8 Claims, 35 Drawing Sheets

U.S. PATENT DOCUMENTS

| | | | |
|---|---|---|---|
| 2002/0060797 A1 | 5/2002 | Namikata | 358/1.9 |
| 2003/0193688 A1 | 10/2003 | Namikata | 358/1.15 |

FOREIGN PATENT DOCUMENTS

| | | |
|---|---|---|
| JP | 09-238264 | 9/1997 |
| JP | 09-261499 | 10/1997 |
| JP | 09-270925 | 10/1997 |
| JP | 10-333377 | 12/1998 |
| JP | 11-041477 | 2/1999 |
| JP | 2000-025274 | 1/2000 |
| JP | 2003-341186 | 12/2003 |

* cited by examiner

FIG. 2

| R | G | B | L | a | b |
|---|---|---|---|---|---|
| 0 | 0 | 0 | 0 | 0 | 0 |
| 0 | 0 | 16 | 12 | −1 | −10 |
| ⋮ | ⋮ | ⋮ | ⋮ | ⋮ | ⋮ |
| 255 | 255 | 255 | 100 | 0 | 0 | a* – b* PLOT a* – L* PLOT b* – L* PLOT

BLACK AMOUNT ADJUSTMENT FUNCTION

L*-a* PLOT

IMAGE PROCESSING METHOD AND APPARATUS

RELATED APPLICATION

This application is a divisional of application Ser. No. 10/180,132, filed Jun. 27, 2002, the entire disclosure for which is hereby incorporated by reference.

BACKGROUND OF THE INVENTION

1. Field of the Invention

The present invention relates to an image processing method and apparatus and, for example, to a color reproduction process of a printer.

2. Background of the Invention

As a method of making color correction for improving a color reproduction effect in a color reproduction process of a printer or printing press, a color masking method of obtaining data on an output color space by making matrix operations of data on an input color space, a method of converting data on an input color space into data on an output color space using a lookup table (LUT), and the like are prevalently used.

However, the output characteristics of a color printer or printing press exhibit strong nonlinearity. Therefore, in a global method such as the color masking method, i.e., a color correction method in which a change in element of a matrix influences the overall output color space, the characteristics of a color printer or printing press cannot be satisfactorily approximated in the entire color gamut. Also, in the method using a LUT, table values are normally obtained by the color masking method, and difficulty in color reproduction remains unsolved.

In general, most of color printers form images using four, i.e., C, M, Y, and K color agents. Images formed by these four color agents look different depending on the way black (K) is generated, although they exhibit the same colorimetric values. Various black generation methods are known. However, most of these methods must change conditions depending on the types of images, the tone characteristics of a printer, and the like, and it is difficult easily to adjust the way black is generated.

SUMMARY OF THE INVENTION

The present invention has been proposed to solve the conventional problems, and has as its object to provide a profile which can accurately approximate strong nonlinear output characteristics of a color printer or printing press, and allows accurate color reproduction.

It is another object of the present invention to realize flexible adjustment of a black plate while maintaining accurate color reproduction in a color printer which forms an image using C, M, Y, and K color agents.

It is still another object of the present invention to generate a conversion table used to realize accurate color reproduction in various color printers by absorbing differences in characteristics for respective printers.

As a method of achieving the above object, an image processing method of the present invention comprises the following steps.

That is, there is provided an image processing method comprising the input step of inputting colorimetric values of color patches output from an output device, the first generation step of generating, on the basis of the colorimetric values, a first conversion condition used to convert a signal on a first color space which depends on a target device into a signal on a second color space which is independent from a device, and the second generation step of generating, on the basis of the colorimetric values, a second conversion condition used to convert a signal on the second color space into a signal on a third color space which depends on the output device, the second generation step generating the second conversion condition by including the first step of converting a signal on the second color space into a signal on an RGB color space, the second step of converting a signal on the RGB color space into a signal on the third color space, and the black amount adjustment step of adjusting a black color value in the signal on the third color space.

Also, there is provided an image processing method of generating a conversion condition between a signal on a device-independent uniform color space, and a signal on a CMY color space depending on a device, on the basis of colorimetric values of color patches output from the device, comprising the step of generating the conversion condition to adjust a K value upon temporarily converting the signal on the uniform color space according to the colorimetric value into a signal on an RGB color space, and converting the signal on the RGB color space into a CMYK signal on the CMY color space.

Furthermore, there is provided an image processing method which comprises the steps of inputting colorimetric values of patches, which are generated by a target device, on the basis of device-dependent color data which is specified by a plurality of color component data including a black component, generating, on the basis of the colorimetric values, a first lookup table used to convert device-dependent color data, which is specified by a plurality of color component data that do not include a black component, into device-independent color data, and generating, by looking up the first lookup table, a second lookup table used to convert the device-independent color data into the device-dependent color data, which is specified by the plurality of color component data that include the black component, the method further comprising the steps of inputting a print agent total amount condition used to control a total amount of print agents, and a black amount adjustment condition that pertains to a black component data generation method, and generating the first and second lookup tables using a conversion condition, which is obtained from the print agent total amount condition and the black amount adjustment condition, and is used to convert the device-dependent color data which is specified by the plurality of color component data that do not include the black component into the device-dependent color data which is specified by the plurality of color component data that include the black component.

That is, there is provided an image processing method comprising the colorimetry step of inputting colorimetric values of color patches output from an output device, the first generation step of generating, on the basis of the colorimetric values, a first conversion condition used to convert a signal on a first color space which depends on a target device into a signal on a second color space which is independent from a device, and the second generation step of generating, on the basis of the colorimetric values, a second conversion condition used to convert a signal on the second color space into a signal on a third color space which depends on the output device, the second generation step including the step of generating the second conversion condition by temporarily converting a signal on the second color space into a signal on an RGB color space, and then converting the signal on the RGB color space into a signal on the third color space.

For example, the second generation step includes the step of generating an RGB conversion condition used to convert a signal on the second color space into a signal on the RGB color space.

There is provided an image processing method of generating a conversion condition between a signal on a device-independent uniform color space, and a signal on an RGB color space depending on a device, on the basis of colorimetric values of color patches output from the device, comprising the step of analyzing a distribution of the colorimetric values on the uniform color space, and determining a parameter upon generating the conversion condition on the basis of the analysis result.

For example, the parameter is a gamma value used in gamma conversion for a signal on a CMY color space obtained by converting a signal on the RGB color space.

As a means for achieving the above objects, an image processing apparatus of the present invention has the following arrangement.

That is, there is provided an image processing apparatus which has first conversion means for converting a signal on a first color space, which depends on a target device, into a signal on a second color space, which is independent of a device, and second conversion means for converting a signal on the second color space into a signal on a third color space which depends on an output device, the apparatus comprising colorimetry means for inputting colorimetric values of color patches output from the output device, first generation means for generating, on the basis of the colorimetric values, a first conversion condition to be looked up by the first conversion means, and second generation means for generating, on the basis of the colorimetric values, a second conversion condition to be looked up by the second conversion means, wherein the second generation means generates the second conversion condition by temporarily converting a signal on the second color space into a signal on the RGB space, and then converting the signal on the RGB space into a signal on the third color space.

The present invention comprises the following arrangement as a means for achieving the above objects.

An image processing method according to the present invention is directed to an image processing method of generating, a printer model used to convert device-dependent data into device-independent data, on the basis of colorimetric results of color patches output from an output device, and generating a conversion table used to convert the device-dependent data into the device-independent data, on the basis of the printer model, comprising the steps of obtaining tone characteristics of the output device from the colorimetric results, and calculating a conversion condition used to convert the tone characteristics into linear characteristics, converting the tone characteristics of the output device into linear characteristic by making tone conversion using the conversion condition, and generating the printer model on the basis of colorimetric results corresponding to data converted by tone conversion.

An image processing apparatus according to the present invention is directed to an image processing apparatus for generating, a printer model used to convert device-dependent data into device-independent data, on the basis of colorimetric results of color patches output from an output device, and generating a conversion table used to convert the device-dependent data into the device-independent data, on the basis of the printer model, comprising calculation means for obtaining tone characteristics of the output device from the colorimetric results, and calculating a conversion condition used to convert the tone characteristics into linear characteristics, tone conversion means for converting the tone characteristics of the output device into linear characteristic by making tone conversion using the conversion condition, and generation means for generating the printer model on the basis of colorimetric results corresponding to data converted by tone conversion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of an RGB→Lab conversion table;

DETAILED DESCRIPTION OF THE PREFERRED EMBODIMENTS

Preferred embodiments of the present invention will now be described in detail in accordance with the accompanying drawings.

First Embodiment

Figure 1:
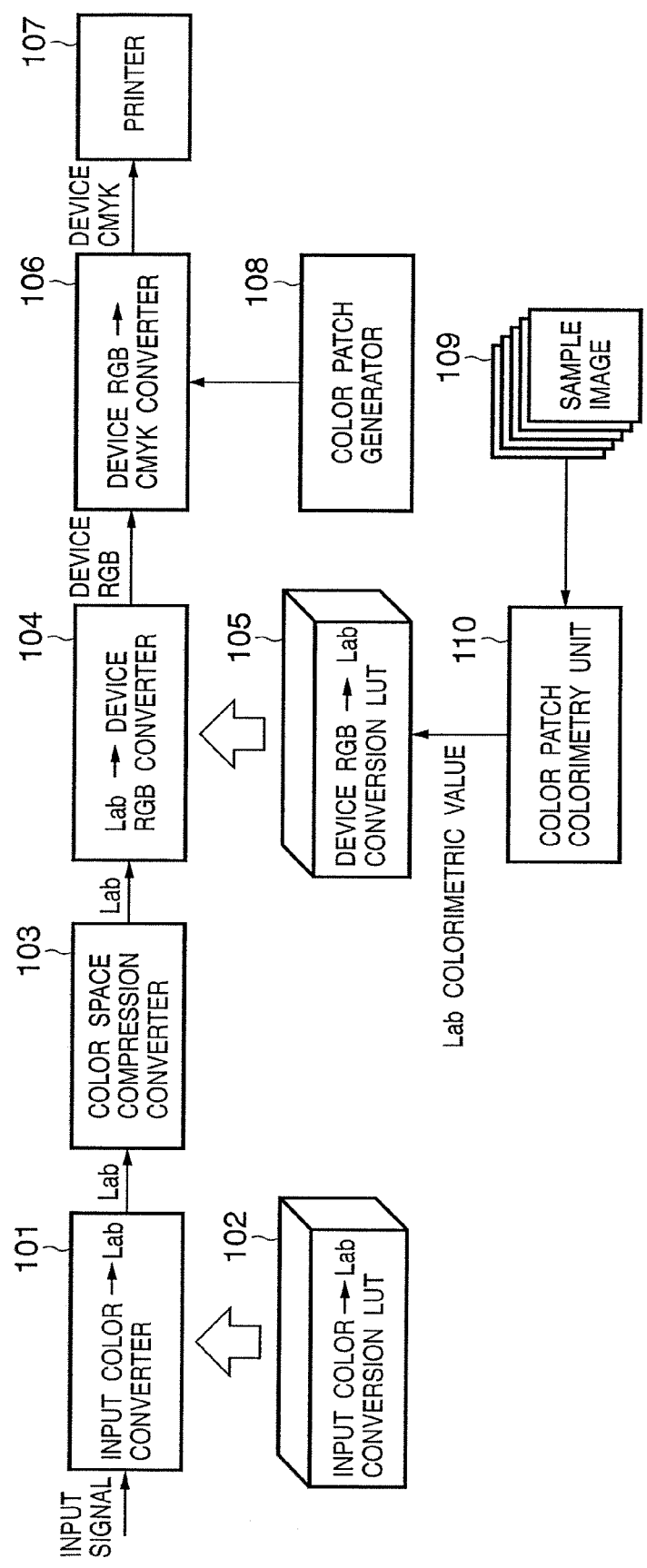
FIG. 1 is a block diagram showing an example of the arrangement of an image processing apparatus according to the first embodiment.

FIG. 1 is a block diagram showing an example of an image processing apparatus of this embodiment.

A signal input to the image processing apparatus shown in FIG. 1 is an image signal of a color space depending on an arbitrary device and, for example, can be an RGB signal which represents an image scanned from a document by an arbitrary scanner, or a CMYK signal to be output to an arbitrary printer. When this embodiment is applied to a copying machine, an input signal is an RGB signal that represents an image scanned by a scanner. For the purpose of proof (test print, proof for correction), the input signal is a CMYK signal to be output to a printing press as a target.

Such input signal is input to an input color→Lab converter 101, and is converted into a signal on an Lab color space as a device-independent color space. This conversion is implemented by LUT conversion using an input color→Lab conversion LUT 102.

As tables of the input color→Lab conversion LUT 102, a table corresponding to the color space of the input signal must be set. For example, when an image signal depending on an RGB color space of scanner A is input, a three-dimensional input-three-dimensional output RGB→Lab conversion table which represents correspondence between RGB values that depend on the RGB color space of scanner A, and Lab values, is set as a table of the input color→Lab conversion LUT 102. Likewise, when an image signal which depends on a CMYK color space of printer B is input, a four-dimensional input-three-dimensional output CMYK→Lab conversion table which represents correspondence between CMYK values that depend on the color space of printer B, and Lab values, is set as a table of the input color→Lab conversion LUT 102.

Figure 2:
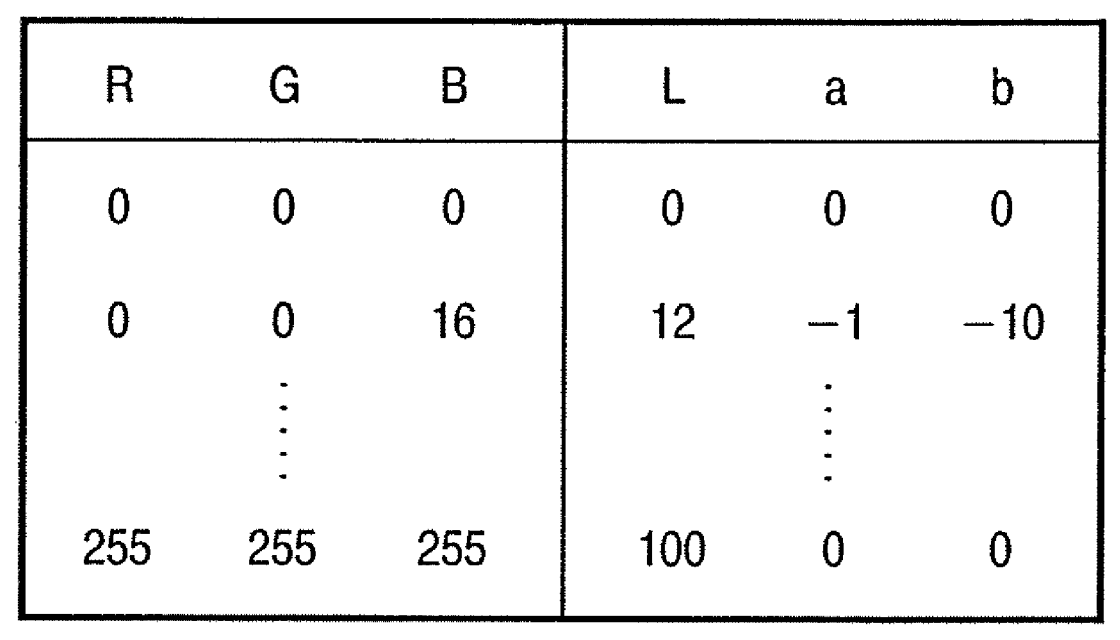

FIG. 2 shows an example of an RGB→Lab conversion table, and shows correspondence between 8-bit RGB and Lab values. Since an actual table stores Lab values using typical RGB values as addresses, the input color→Lab converter 101 extracts an Lab value near the input RGB value from the table, and makes an interpolation operation for the extracted Lab value to acquire an Lab value corresponding to the input RGB value.

An Lab signal output from the input color→Lab converter 101 is converted into a signal of a device RGB color space by an Lab→device RGB converter 104 on the basis of a device RGB→Lab conversion LUT 105. Details of this conversion process will be described later.

If the color space of the input signal is an RGB color space, its color gamut is often broader than the color reproduction range of a printer. For this reason, the Lab signal output from the input color→Lab converter 101 is mapped on the color reproduction range of a printer 107 by a color space compression converter 103 (gamut mapping), and is then input to the Lab→device RGB converter 104. As a practical method of gamut mapping, a method of executing a color space compression process in a uniform color space, as disclosed in Japanese Patent Laid-Open No. 8-130655, or the like may be used. Also, other known color space compression methods may be used.

A signal of the device RGB color space output from the Lab→device RGB converter 104 is converted into a signal of a CMYK color space, which depends on the printer 107, by a device RGB→CMYK converter 106, and the converted signal is sent to the printer 107. Various methods are available for RGB→CMYK conversion, and an arbitrary method may be used. For example, conversion formulas (1) below are used:

$$C=(1.0-R)-K$$

$$M=(1.0-G)-K$$

$$Y=(1.0-B)-K$$

$$K=\min\{(1.0-R), (1.0-G), (1.0-B)\} \quad (1)$$

[Lab→Device RGB Conversion]

Details of the Lab→device RGB converter 104 will be explained below.

Figure 3:
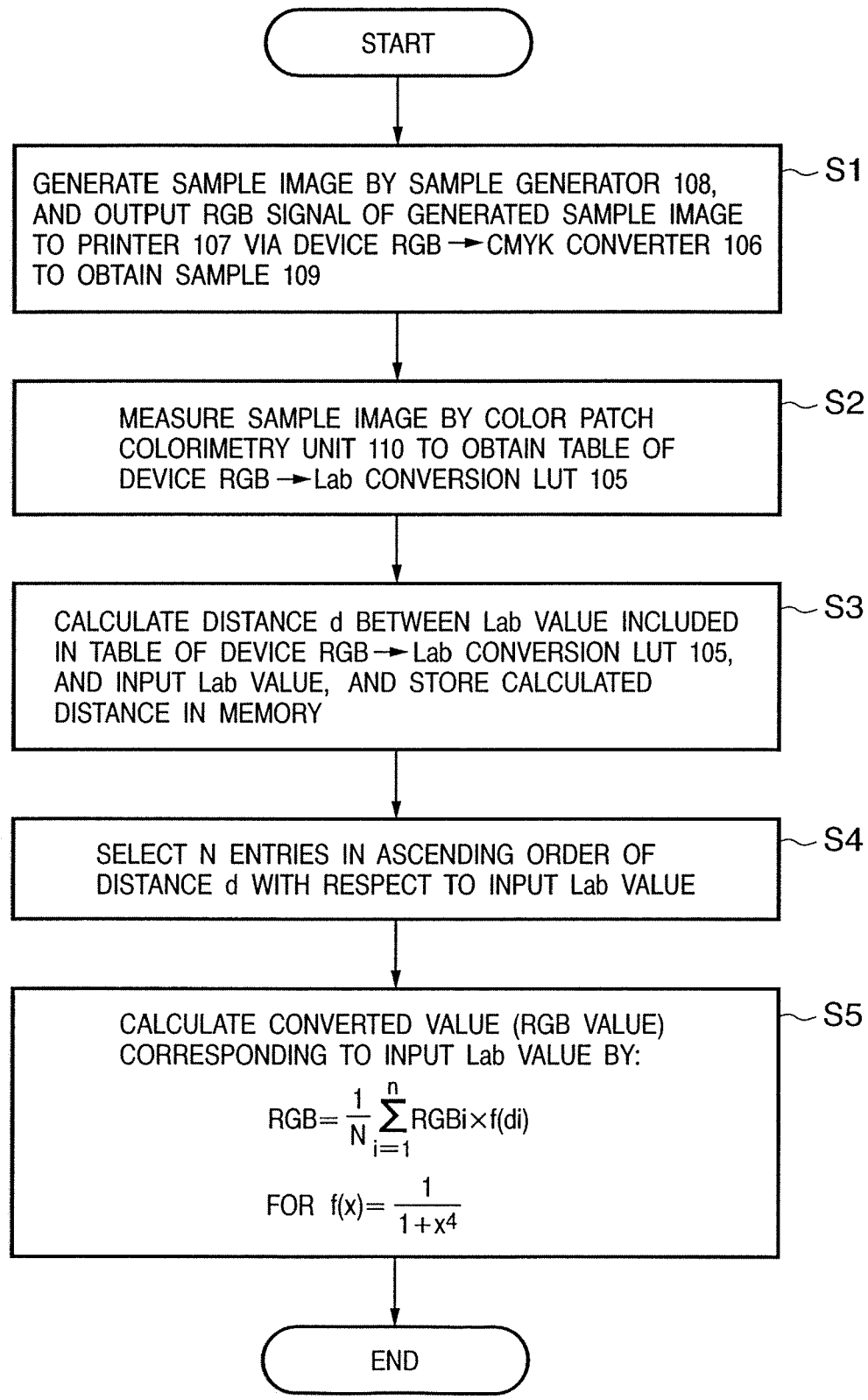
FIG. 3 is a flow chart showing the sequence for executing device RGB→Lab conversion by obtaining correspondence between device RGB values Lab colorimetric values.

The Lab→device RGB converter 104 converts a signal on the basis of correspondence between device RGB values and Lab colorimetric values, which is obtained in advance. FIG. 3 is a flow chart showing the sequence for executing device RGB→Lab conversion by obtaining correspondence between device RGB values Lab colorimetric values. Of course, if the correspondence between device RGB values Lab colorimetric values has already been obtained, steps S1 and S2 are skipped.

Step S1

Figure 4:
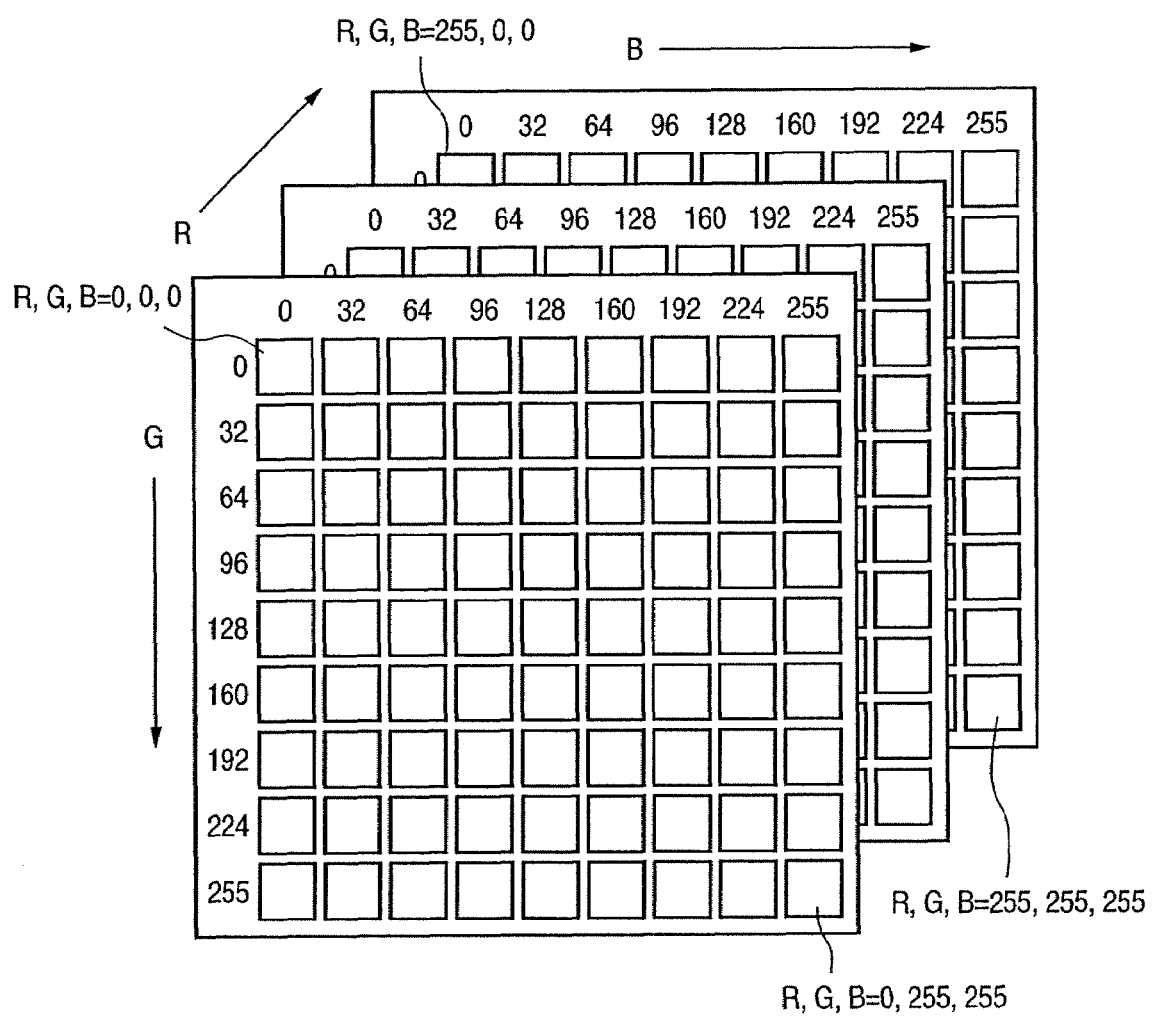
FIG. 4 shows an example of a sample image.

A color patch generator 108 generates sample images formed by a plurality of color patches, as shown in FIG. 4. The RGB signals of the generated sample images are output to the printer 107 via the device RGB→CMYK converter 106 to obtain sample images 109.

The color patch generator 108 generates sample images by equally dividing the device RGB color space. In the example of FIG. 4, the RGB color space in which R, G, and B data are respectively expressed by 8 bits is equally divided into 9×9×9 to obtain 729 patches. Generally, a color space depending on the printer 107 is a CMYK color space, but since the RGB color space can be converted into the CMYK color space via a conversion rule, the RGB color space is considered as a color space depending on the printer 107.

Step S2

Figure 5:
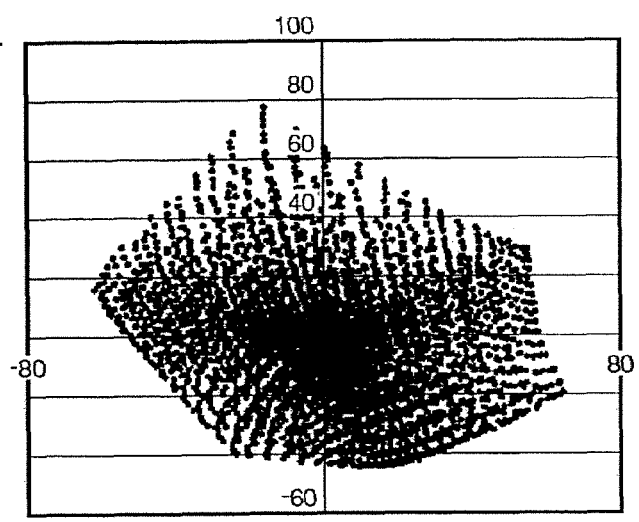
FIG. 5 shows an example of colorimetry results of a color patch colorimetry unit.
Figure 5:
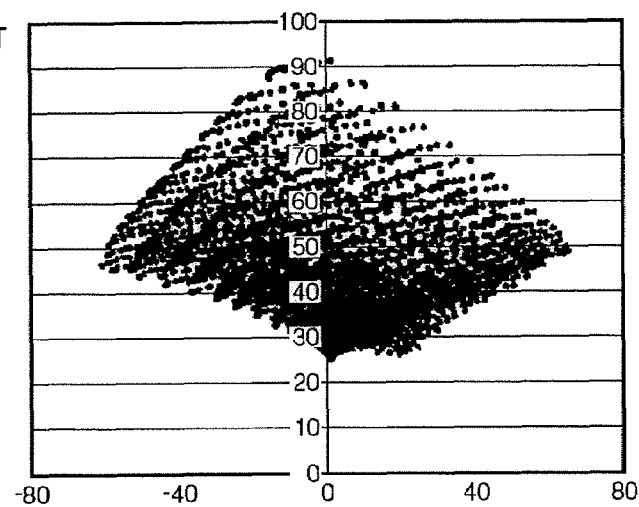
Figure 5:
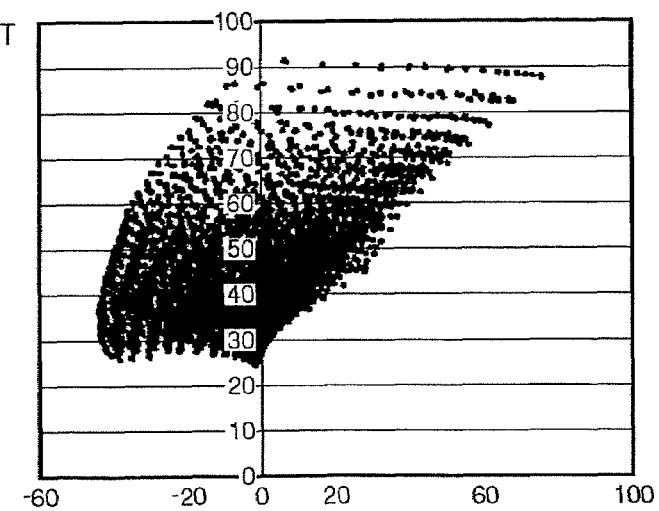

A color patch colorimetry unit 110 measures the color patches of the obtained sample image 109 to obtain Lab colorimetric values of the respective color patches. The obtained Lab colorimetric values are distributed on an Lab color space, as shown in FIG. 5. With this operation, the RGB values generated by the color patch generator 108 and Lab colorimetric values measured by the color patch colorimetry unit 110 can be obtained and, hence, a table of the device RGB→Lab conversion LUT 105 can be obtained. Using this device RGB→Lab conversion LUT 105, Lab→device RGB conversion is done.

When an LUT is used, an interpolation operation such as cubic interpolation, tetrahedral interpolation, or the like as a known method is used. Such interpolation operation requires grids at equal intervals, which correspond to the input side of an LUT. In the table of the device RGB→Lab conversion LUT 105, device RGB values are arranged at equal intervals, but Lab colorimetric values are not arranged at equal intervals. For this reason, when Lab values are to be input, the table of the device RGB→Lab conversion LUT 105 does not form an LUT having grids at equal intervals. Hence, an interpolation operation that inputs Lab values cannot be simply made. Hence, Lab→device RGB conversion is made in the following sequence.

Step S3

Distances d (equivalent to a color difference based on the Lab color difference method) between Lab values included in the table of the device RGB→Lab conversion LUT 105 and input Lab values are calculated and are stored in a memory.

Step S4

Figure 6:
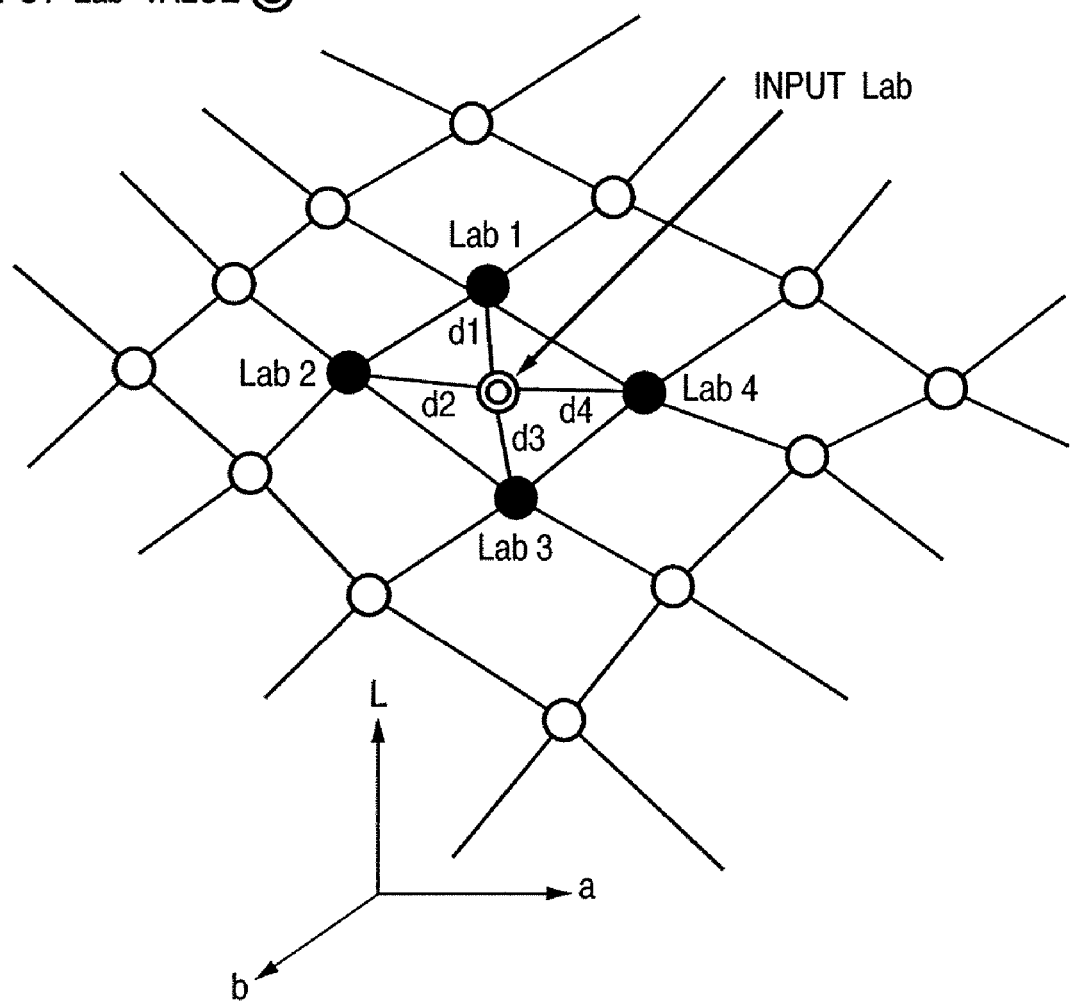
FIG. 6 is a view for explaining selection of sample points.

As shown in FIG. 6, N entries ● are selected in ascending order of distance d with respect to the input Lab values •. At this time, entries are described as follows in ascending order of distance d.

1 RGB value Lab colorimetric value Distance $RGB_1$ $Lab_1$ $d_1$
$RGB_2$ $Lab_2$ $d_2$ $RGB_3$ $Lab_3$ $d_3$ ... $RGB_N$ $Lab_N$ $d_N$
For $d_1 < d_2 < d_3 < ... < d_N$.

Step S5

A converted value (RGB value) corresponding to an input Lab value is calculated by:

$$RGB = (1/N) \times \sum_{i=1}^{} NRGBi \times f(di)$$

for $f(x) = 1/(1 + x^4)$

Figure 7:
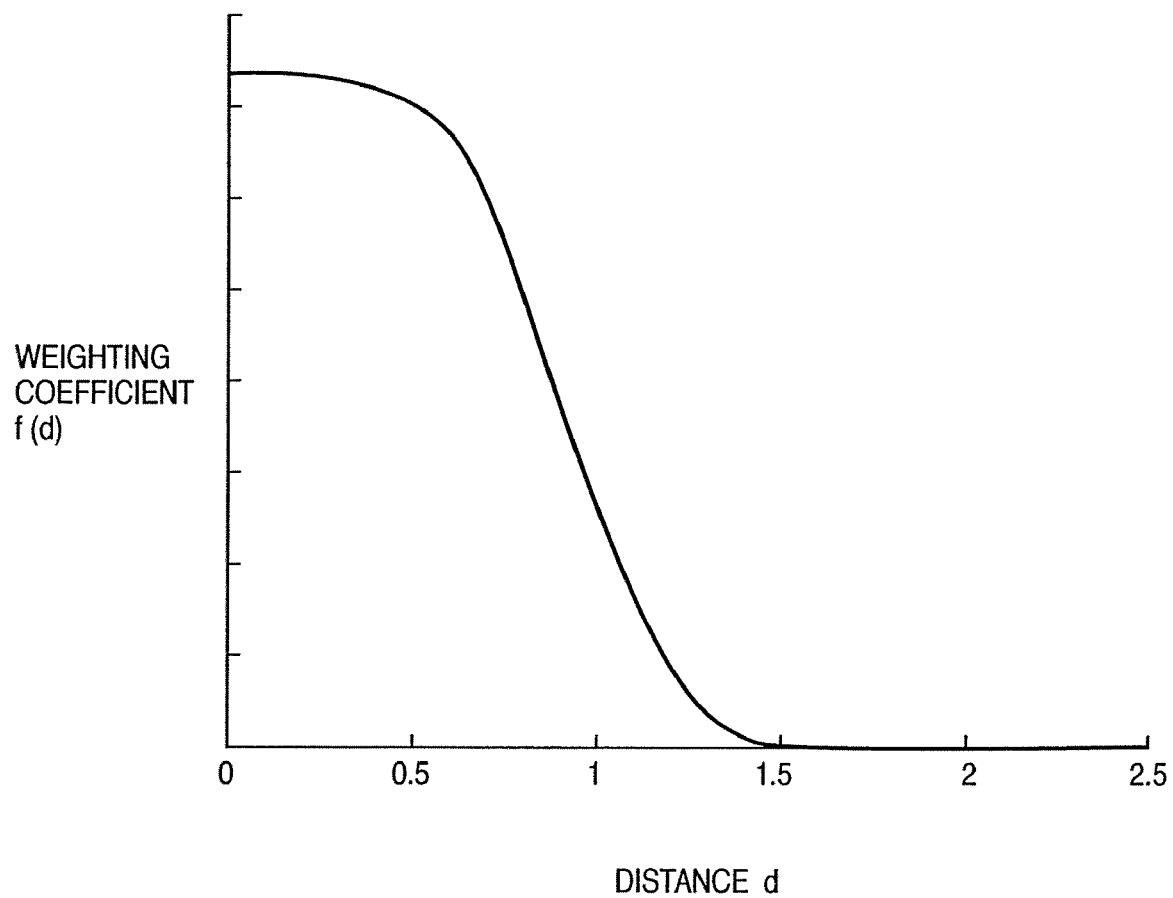
FIG. 7 is a graph for explaining a weighting function according to distance d.

Since the function f(x) has characteristics as shown in FIG. 7, the calculation given by the above equation makes an interpolation operation by multiplying an RGB value corresponding to a closer Lab colorimetric value on the Lab color space by a larger weighting coefficient The number N of sample points used in the interpolation operation can be defined by a constant (e.g., 8) in the entire Lab color space. However, since colorimetric values are concentrated on a region of low lightness L*, as shown in FIG. 5, depending on the conversion method in the device RGB→CMYK converter 106, a problem may be posed if N is a constant. That is, in a region where colorimetric values are concentrated, distance d becomes very small, and if N is small, the interpolation operation is made by multiplying a few sample points by large weighting coefficients. As a result, problems such as tone jump in the device RGB color space, collapse of white balance in a low-lightness region, and the like readily occur.

Figure 8:
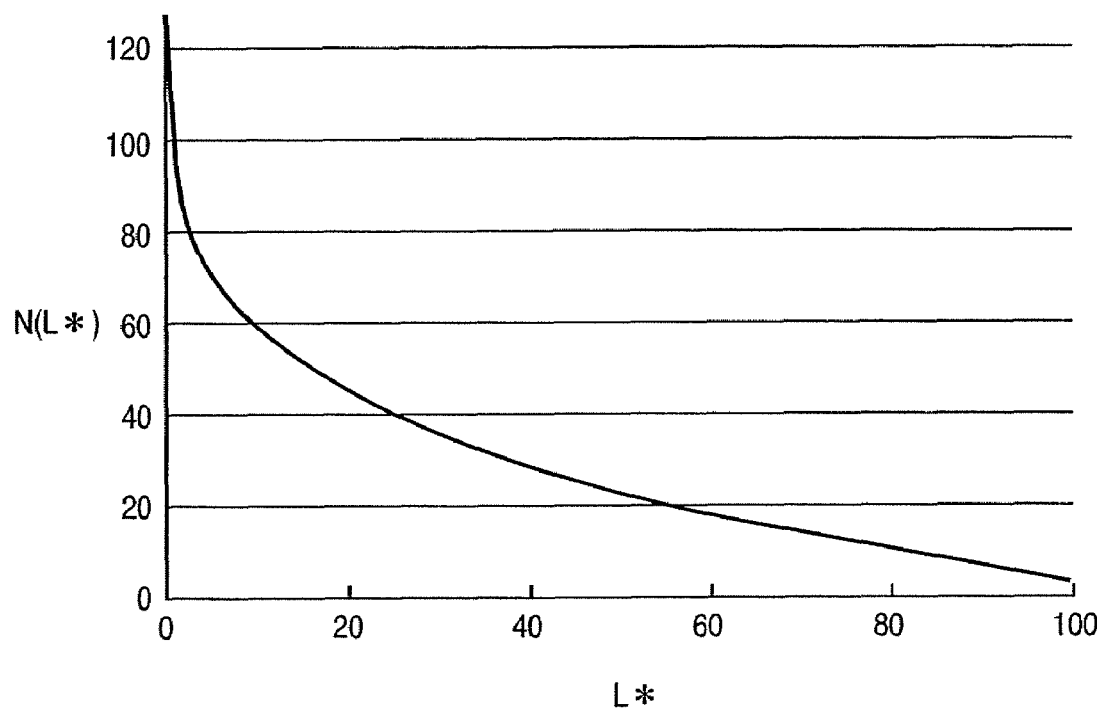
FIG. 8 is a graph for explaining a function for changing the number of sample points.

Hence, as shown in FIG. 8, when the interpolation operation is made while changing the number of sample points in correspondence with an L* value of the input Lab value, the aforementioned problems can be effectively solved. Of course, even in a high-lightness region, the number of samples used in the interpolation operation is limited, and color turbidity or the like hardly occurs. Note that the example of a function N(L*) shown in FIG. 8 is a (¼)th power function which yields 128 when L*=0, and 4 when L*=100.

When the processes in steps S3 to S5 are repeated for all input Lab values, the Lab signal can be converted into the device RGB signal.

Second Embodiment

An image processing apparatus according to the second embodiment of the present invention will be described below. Note that the same reference numerals in this embodiment denote substantially the same parts as in the first embodiment, and a detailed description thereof will be omitted.

Figure 9:
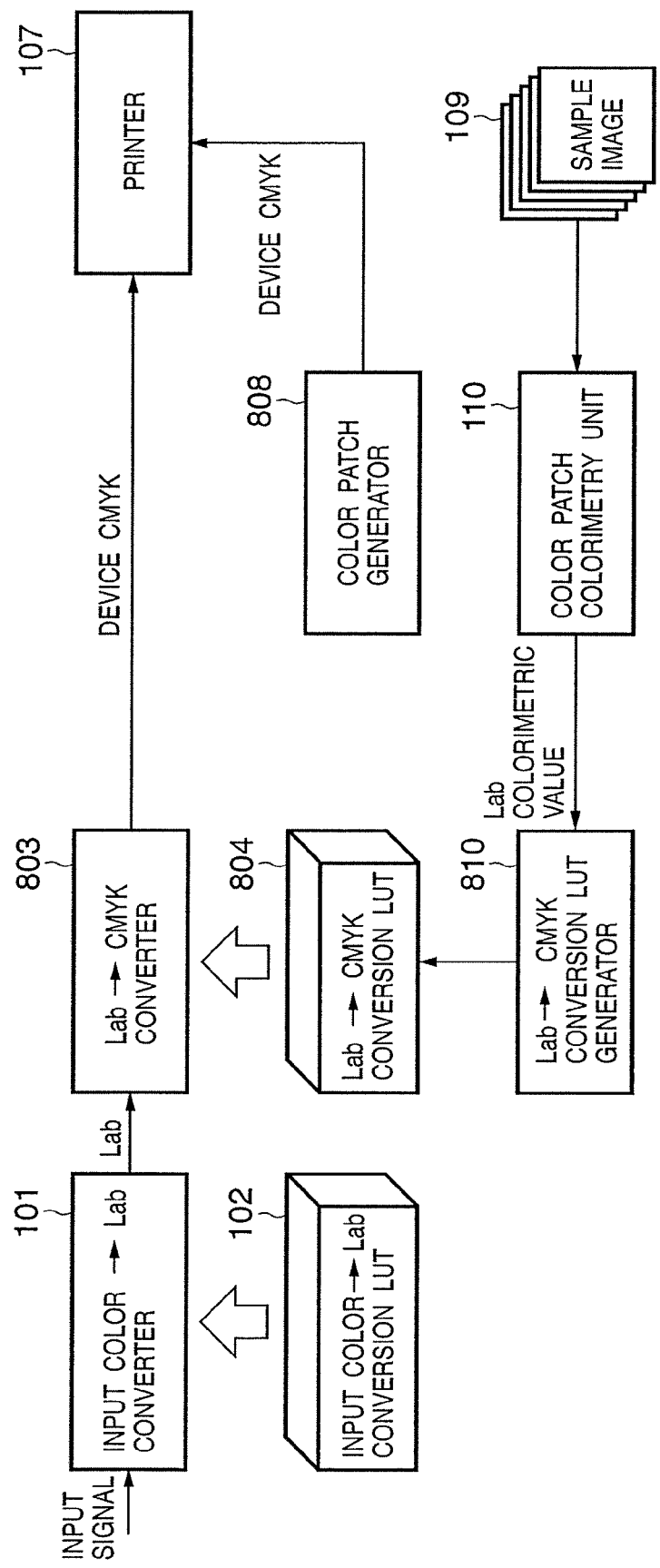
FIG. 9 is a block diagram showing an example of the arrangement of an image processing apparatus according to the second embodiment.

FIG. 9 is a block diagram showing an example of the arrangement of an image processing apparatus of the second embodiment. Unlike in the image processing apparatus of the first embodiment, the image processing apparatus of the second embodiment converts a signal of a device-independent color space into a signal of a color space of the printer 107 using an LUT as in conversion of an input signal into a signal of a device-independent color space.

An Lab→CMYK converter 803 converts an Lab signal into a signal of a CMYK color space depending on the printer 107 using an Lab→CMYK conversion LUT 804. A CMYK signal output from the Lab→CMYK converter 803 is sent to the printer 107. The Lab→CMYK conversion LUT 804 is generated as follows.

CMYK signals of sample images generated by a color patch generator 808 are output to the printer 107 to obtain sample images 109.

The color patch colorimetry unit 110 measures color patches of the obtained sample images 109 to obtain Lab colorimetric values of the color patches. Based on the obtained Lab colorimetric values and CMYK values generated by the color patch generator 808, an Lab→CMYK conversion LUT generator 810 generates a CMYK→Lab conversion LUT. Based on the generated CMYK→Lab conversion LUT, the Lab→CMYK conversion LUT 804 is generated using the same method as in the first embodiment.

For example, if an Lab value is an 8-bit signal, an L* value ranges from 0 to 255, and a* and b* values range from −128 to 127. If Lab grids are formed by dividing the respective ranges of Lab by 16 steps, a table of the Lab→CMYK conversion LUT 804 can be generated by 4913 (=17³) calculations.

In the first embodiment, the Lab color space is converted into the device RGB color space using the LUT, and the device RGB color space is then converted into the CMYK color space by the arithmetic process. However, in the second embodiment, these conversion processes can be done using a single LUT, thus improving the conversion efficiency.

Third Embodiment

An image processing apparatus according to the third embodiment of the present invention will be described below. Note that the same reference numerals in this embodiment denote substantially the same parts as in the first embodiment, and a detailed description thereof will be omitted.

Figure 10:
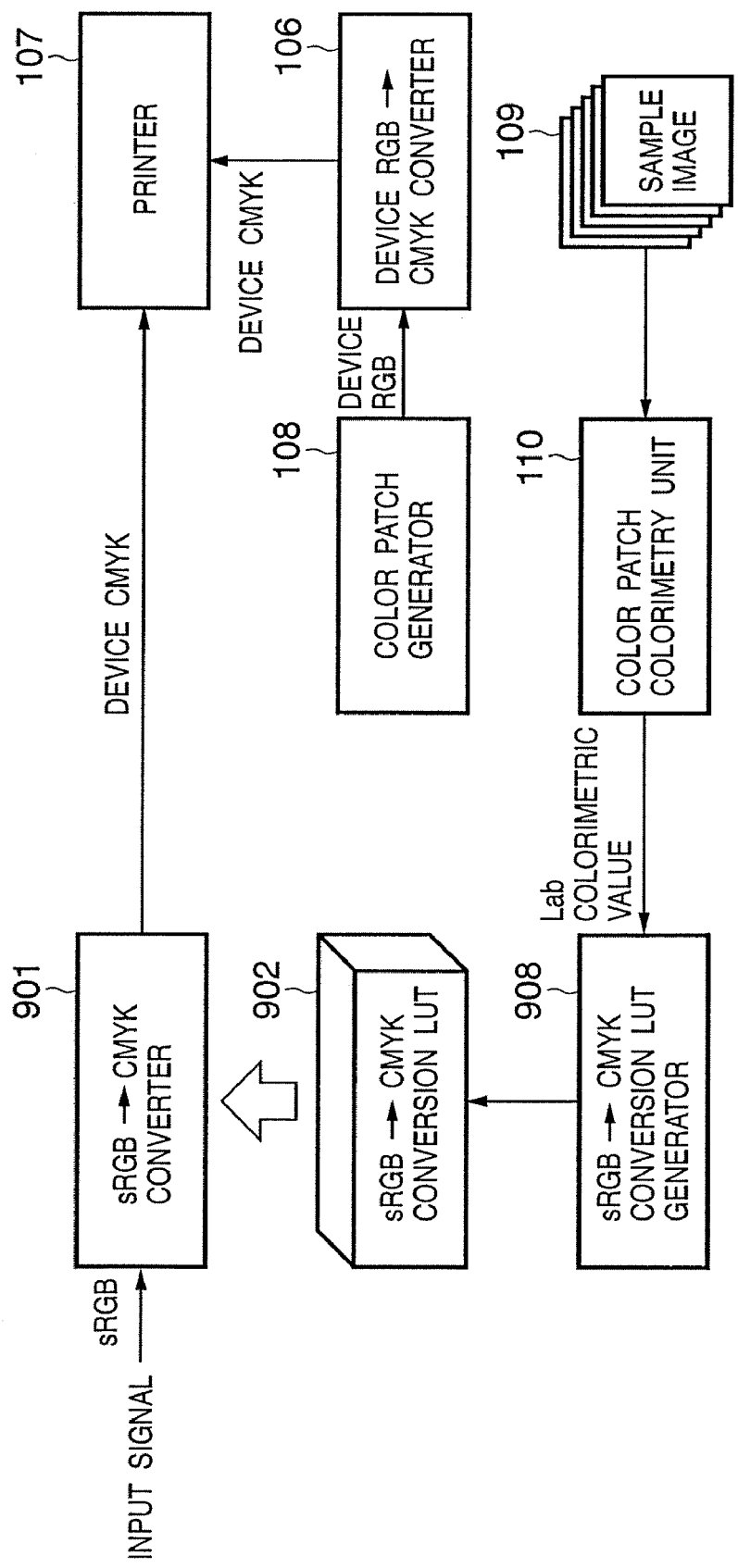
FIG. 10 is a block diagram showing an example of the arrangement of an image processing apparatus according to the third embodiment.

FIG. 10 is a block diagram showing an example of the arrangement of an image processing apparatus of the third embodiment, and this apparatus has an arrangement for receiving an input signal of an sRGB color space which will become a standard color space in the Internet. Correspondence between the sRGB color space and an XYZ color space has already been defined, and the sRGB color space can be considered as a device-independent color space. Hence, when an sRGB value is converted into an XYZ value or Lab value, and the Lab color space is then converted into a printer color space, as described above, an image expressed by a signal on the sRGB color space can be reproduced.

Referring to FIG. 10, an sRGB→CMYK converter 901 converts an input signal of the sRGB color space into a signal of the CMYK color space which depends on the printer 107 using an sRGB→CMYK conversion LUT 902. A CMYK signal output from the sRGB→CMYK converter 901 is sent to the printer 107. The sRGB→CMYK conversion LUT 902 is generated as follows.

RGB signals of sample images generated by the color patch generator 108 are converted into CMYK signals depending on the printer 107 by the device RGB→CMYK converter 106, and the CMYK signals are output to the printer 107, thus obtaining sample images 109.

The color patch colorimetry unit 110 measures color patches of the obtained sample images 109 to obtain Lab colorimetric values of the color patches. Based on the obtained Lab colorimetric values and the RGB values generated by the color patch generator 108, an sRGB→CMYK conversion LUT generator 908 generates a table of the sRGB→CMYK conversion LUT 902.

The process of the sRGB→CMYK conversion LUT generator 908 generates a table of the sRGB→CMYK conversion LUT 902 on the basis of CMYK values obtained by executing the device RGB→CMYK conversion process described in the first embodiment for the RGB values generated by the color patch generator 108, and sRGB values obtained by executing Lab→XYZ and XYZ→sRGB conversion processes according to definition formulas for the Lab colorimetric values. For example, if an sRGB signal is an 8-bit signal, when sRGB grids are formed by dividing the respective ranges of sRGB by 16 steps, a table of the sRGB→CMYK conversion LUT 902 can be generated by 4913 (=17³) calculations.

According to each of the first to third embodiments described above, a color conversion method which can accurately approximate the strong nonlinear output characteristics of a color printer or printing press, and can achieve accurate color reproduction can be provided. Therefore, since color space conversion that satisfactorily reflects the characteristics of a printer or printing press is done in a device-independent color space, the printer or printing press can achieve accurate color reproduction for every input color spaces.

In each of the above embodiments, the Lab color space has been explained as a device-independent color space. However, if another uniform color space, e.g., an Luv color space, is used, the same effects can be obtained.

Fourth Embodiment

An image processing apparatus according to the fourth embodiment of the present invention will be described below. Since an example of the arrangement of the image processing apparatus of this embodiment is substantially the same as that in the first embodiment, the same reference numerals denote the same parts, and a detailed description thereof will be omitted. In the fourth embodiment, the conversion method in the device RGB→CMYK converter 106 is replaced by a method different from that in the first embodiment.

Figure 11:
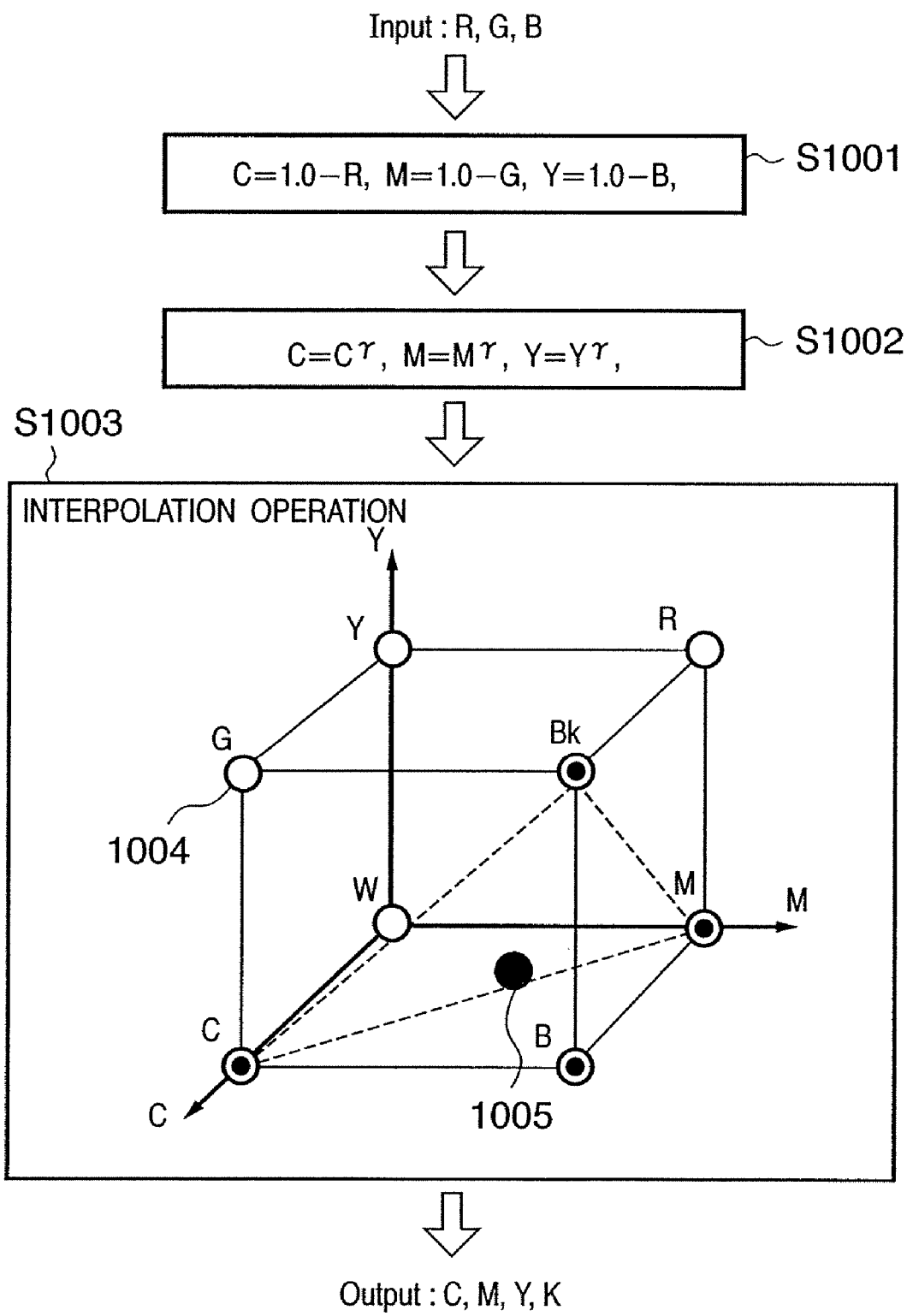
FIG. 11 is a flow chart showing the flow of a device RGB→CMYK conversion process according to the fourth embodiment.

FIG. 11 is a flow chart showing the flow of the process in the device RGB→CMYK converter 106 of the fourth embodiment. An input device RGB value which has been normalized to [0:1] undergoes an inversion process to be converted into a CMY signal in step S1001. After that, in step S1002 the CMY signal undergoes gamma conversion using a parameter γ, which conversion is described by:

$$C=C^\gamma$$

$$M=M^\gamma$$

$$Y=Y^\gamma$$

In the fourth embodiment, the parameter γ in the above equations is set to be γ=1.6.

The gamma-converted CMY signal undergoes an interpolation operation using grids (lattice points) to be converted into a CMYK signal in step S1003, as will be described below.

Grids 1004 used in the interpolation operation process in step S1003 are located at the vertices of a cube on the CMY space in which each of C, M, and Y has a range of [0:1], and each grid corresponds to a CMYK value as follows.

2 Grid Value Corresponding CMYK value CMY C M Y K White (W) 000 0.0 0.0 0.0 0.0 Red (R) 011 0.0 0.9 0.9 0.0 Yellow (Y) 001 0.0 0.0 1.0 0.0 Green (G) 101 0.9 0.0 0.9 0.0 Cyan (C) 100 1.0 0.0 0.0 0.0 Blue (B) 110 0.9 0.9 0.0 0.0 Magenta (M) 010 0.0 1.0 0.0 0.0 Black (Bk) 111 0.4 0.4 0.4 1.0

The distance between an input CMY value 1005 and each CMY grid value is calculated, and a linear weighting operation for a corresponding CMYK value is made using a weighting coefficient corresponding to the distance, thus outputting a CMYK value.

In general, an ideal toner (ink) amount cannot often be put on the medium depending on transferability, fixability, and the like of toner in case of an electrophotography printer, or the ink permeability of the medium in case of an ink-jet printer. As a result, a secondary color (RGB) cannot often be output using a toner amount for two colors, or Bk cannot often be output using a toner amount for three or four colors.

In the fourth embodiment, assume that a toner amount only for 1.8 colors can be used for a secondary color, and a toner amount only for 2.2 colors can be used for black in the printer 107 as an output target. Hence, as shown in the table above, CMYK values corresponding to CMY values (0, 1, 1), (1, 0, 1), and (1, 1, 0) which indicate red, green, and blue are respectively set to be (0.0, 0.9, 0.9, 0.0), (0.9, 0.0, 0.9, 0.0), and (0.9, 0.9, 0.0, 0.0). Also, a corresponding CMYK value of black is set to be (0.4, 0.4, 0.4, 1.0).

More generally speaking, if col2 represents a secondary color toner amount, and col4 represents a Bk toner amount, corresponding CMYK values of red, green, blue, and black are set as follows:

3 Red=(0, col2/2, col2/2, 0) Green=(col2/2, 0, col2/2, 0) Blue=(col2/2, col2/2, 0, 0) Black=((col4-1)/3, (col4-1)/3, (col4-1)/3, 1)

That is, in the fourth embodiment, col2=1.8, and col4=2.2.

Of course, the aforementioned corresponding CMYK values and definitions are not limited to such specific example, and can be arbitrarily set in accordance with the device characteristics or output purposes intended. For example, if the corresponding CMYK value of black is set to be (0, 0, 0, 1), pure black expressed by RGB=(0, 0, 0) can be printed using black toner alone, and 100% UCR can be realized.

Figure 12:
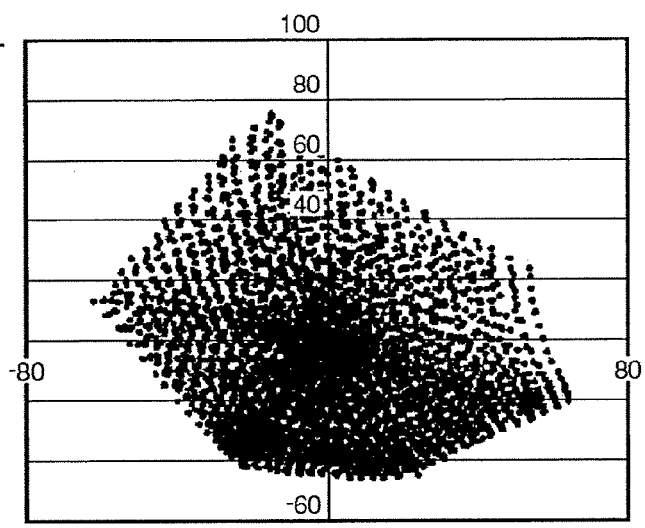
FIG. 12 shows an example of color patch colorimetry results in the fourth embodiment.
Figure 12:
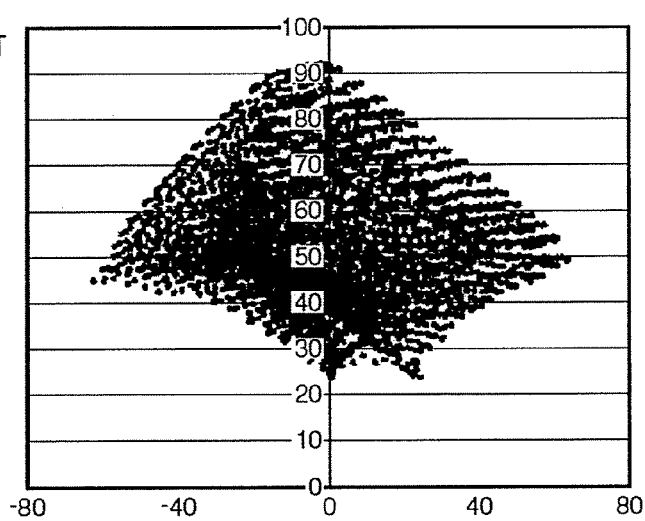
Figure 12:
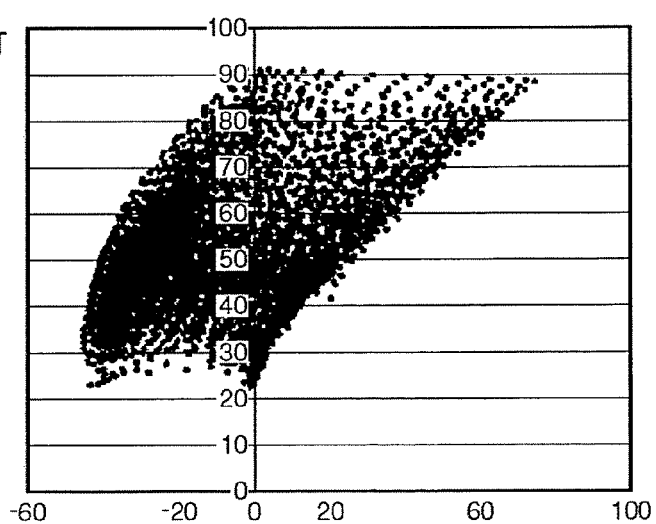

In the fourth embodiment as well, sample images 109 are output from the printer 107 by executing device RGB→CMYK conversion based on color patches output from the color patch generator 108 as in step S1 of the first embodiment. As in step S2, the color patch colorimetry unit 110 measures the color patches of the obtained sample images 109 to obtain Lab colorimetric values of the respective color patches. In the fourth embodiment, the obtained Lab colorimetric values are distributed on the Lab color space, as shown in FIG. 12. As can be seen from FIG. 12, the distribution density in a region of low L* is low, and the density in a region of high L* is high, compared to the Lab colorimetric value distribution of output patches using device RGB→CMYK conversion given by equations (1) and shown in FIG. 5.

Therefore, when the color patches output based on device RGB→CMYK conversion in the fourth embodiment are used, the problems discussed in the first embodiment, i.e., tone jump in the device RGB color space, collapse of white balance in a low-lightness region, and the like caused by dense samples in the low-lightness region, can be easily solved without changing the number of sample points shown in FIG. 8 of the first embodiment.

In order to set the density of the colorimetric value distribution of color patches independently of lightness, the parameter (γ value) of gamma conversion can be appropriately changed in accordance with the tone characteristics of the output printer, as described in the fourth embodiment. Also, it is effective to use other calculation methods such as a polynomial function and the like in place of gamma conversion.

Fifth Embodiment

An image processing apparatus according to the fifth embodiment of the present invention will be described below. Note that the same reference numerals in the fifth embodiment denote substantially the same parts as in the first embodiment, and a detailed description thereof will be omitted.

Figure 13:
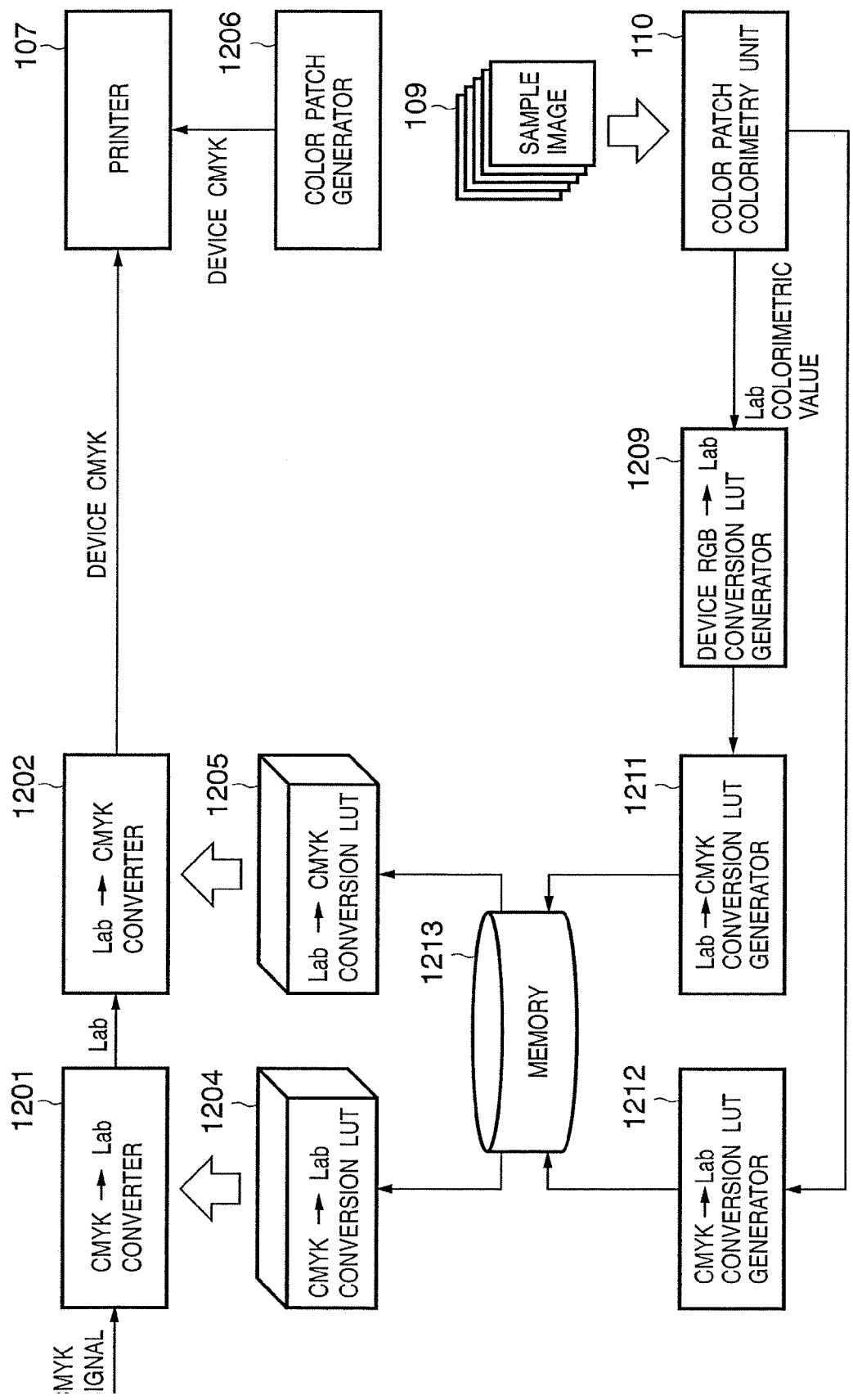
FIG. 13 is a block diagram showing an example of the arrangement of an image processing apparatus according to the fifth embodiment.

FIG. 13 is a block diagram showing an example of the arrangement of the image processing apparatus of the fifth embodiment. In the fifth embodiment, conversion from a signal of a device-independent color space into a signal of a color space of the printer 107 is done using an LUT as in the second embodiment. Furthermore, the generation method of that LUT will be described in detail.

In each of the above embodiments, the output device profile generation method has been explained. That is, the device value (e.g., CMYK)→Lab conversion LUT and Lab→device value (e.g., CMYK) conversion LUT respectively correspond to destination and source profiles of an output device.

In some cases, an image that has undergone color conversion in correspondence with the output characteristics of a printing press as a target is printed using a copying machine or printer for the purpose of proof (test print, proof for correction). To execute such proof, sample image data must be supplied to an output device used in proof to make the device print sample images, and a profile must be generated based on the colorimetric values of color patches of the obtained sample images by the method explained in each of the above embodiment. Then, an image that has undergone color conversion using the generated profile is printed by the output device.

In the fifth embodiment, a profile generation process for an output device used in proof will be described. Note that a profile generated in the fifth embodiment is not limited to that for proof, but can also be used in normal output (print).

An arrangement including a CMYK o Lab converter 1201, an Lab→CMYK converter 1202, the printer 107, a CMYK→Lab conversion LUT 1204, and an Lab→CMYK conversion LUT 1205 shown in FIG. 13 is that for a general proof system.

A CMYK signal input to the CMYK→Lab converter 1201 depends on the characteristics of a printing press as a target, and is converted into a signal of the Lab color space as a device-independent color space by CMYK→Lab conversion using the CMYK→Lab conversion LUT 1204 that holds correspondence between the CMYK color space depending on the printing press device and the device-independent color space (Lab).

The converted Lab signal is converted into a signal of the CMYK color space by the Lab.div.CMYK converter 1202 using the Lab→CMYK conversion LUT 1205 that holds correspondence between the CMYK color space depending on the printer 107 and the Lab color space, and the converted signal is output from the printer 107.

In this manner, both CMYK→Lab conversion and Lab→CMYK conversion in the fifth embodiment are implemented by loading the LUTs and making interpolation operations by addressing the LUTs using the input signals.

Such color matching method is executed in color matching using CRD in PostScript, or that using an ICC profile. Especially, the ICC profile comprises a CMYK→Lab conversion LUT and Lab→CMYK conversion LUT to allow mutual conversion between a device-dependent color space and device-independent color space.

The Lab→CMYK conversion LUT 1205 and CMYK→Lab conversion LUT 1204 are respectively generated by an Lab→CMYK conversion LUT generator 1211 and CMYK→Lab conversion LUT generator 1212, on the basis of colorimetric values by outputting CMYK color patches output from a color patch generator 1206 from the printer 107 and measuring the obtained sample images 109 by the color patch colorimetry unit 110.

The Lab→CMYK conversion LUT generator 1211 generates the Lab v CMYK conversion LUT 1205 by executing conversion from Lab colorimetric values of the sample images into CMYK values as in the processes of the Lab→device RGB converter 104 and device RGB→CMYK converter 106 of the first embodiment. However, since Lab→CMYK conversion in the first embodiment is computed based on the colorimetric values of RGB color patches, the colorimetric values of CMYK color patches in the fifth embodiment cannot be directly applied. Hence, in the fifth embodiment, a device RGB→Lab conversion LUT generator 1209 is added so as to generate a pseudo-colorimetric value table of RGB color patches.

On the other hand, the CMYK→Lab conversion LUT generator 1212 generates the CMYK→Lab conversion LUT 1204 by an interpolation operation using the colorimetric value table of CMYK color patches.

The generated LUTs are stored in a storage unit 1213, and are set as the Lab→CMYK conversion LUT 1205 to be looked up by the Lab→CMYK converter 1202, or as the CMYK→Lab conversion LUT 1204 to be looked up by the CMYK→Lab converter 1201 for a proof system corresponding to another printing press when they are used. Details of the operations in the respective processors shown in FIG. 13 will be described later.

Figure 14:
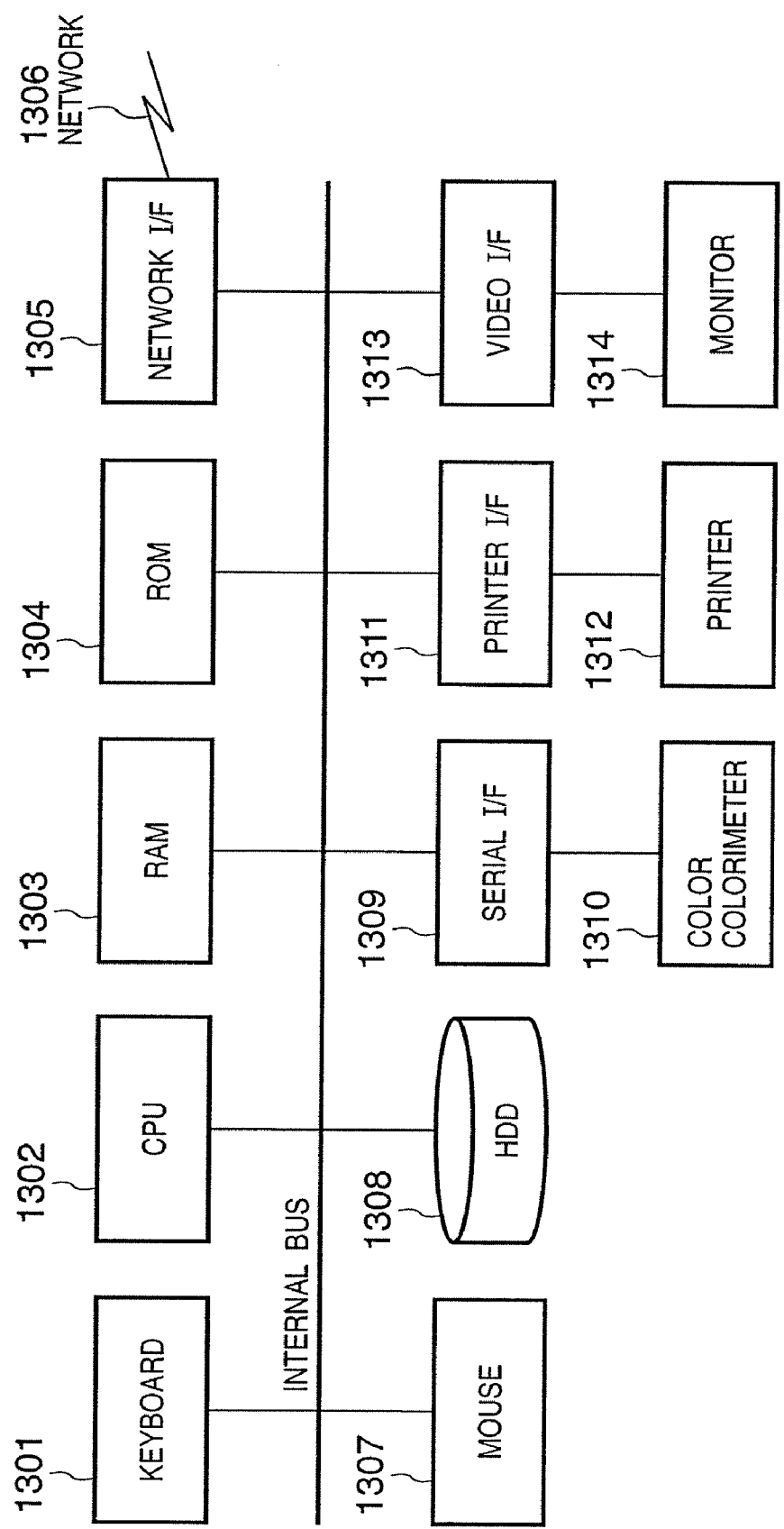
FIG. 14 is a block diagram showing an example of the arrangement upon implementing the fifth embodiment on a computer system.

FIG. 14 is a block diagram showing an example of the arrangement when the image processing apparatus of the fifth embodiment is implemented on a computer system, i.e., a popular computer system arrangement. The respective processors (1201, 1202, 1206, 1209, 1211, and 1212) shown in FIG. 13 are implemented as modules of a program stored in a RAM 1303 or ROM 1304, and are read out and executed by a CPU 1302. Also, the LUTs (1204 and 1205) shown in FIG. 13 are implemented as areas assured on the RAM 1303. A printer 1312 serves as the printer 107 in FIG. 13 when it is controlled by a printer driver, which is executed by the CPU 1302, via a printer I/F 1311. Note that another printer present on a network 1306 may be used as the printer 107 via a network I/F 1305.

The color patch colorimetry unit 110 in FIG. 13 is implemented by a color colorimeter 1310 controlled via a serial I/F 1309, and an HDD 1308 is used as the storage unit 1213. A monitor 1314 is controlled via a video I/F 1313, and is used to display a GUI used to control respective modules, color patches, and the like. A keyboard 1301 and mouse 1307 are used to make user's inputs and the like via the GUI.

The operations of the processors shown in FIG. 13 will be described in detail below with reference to FIGS. 15A and 15B.

Figure 15A:
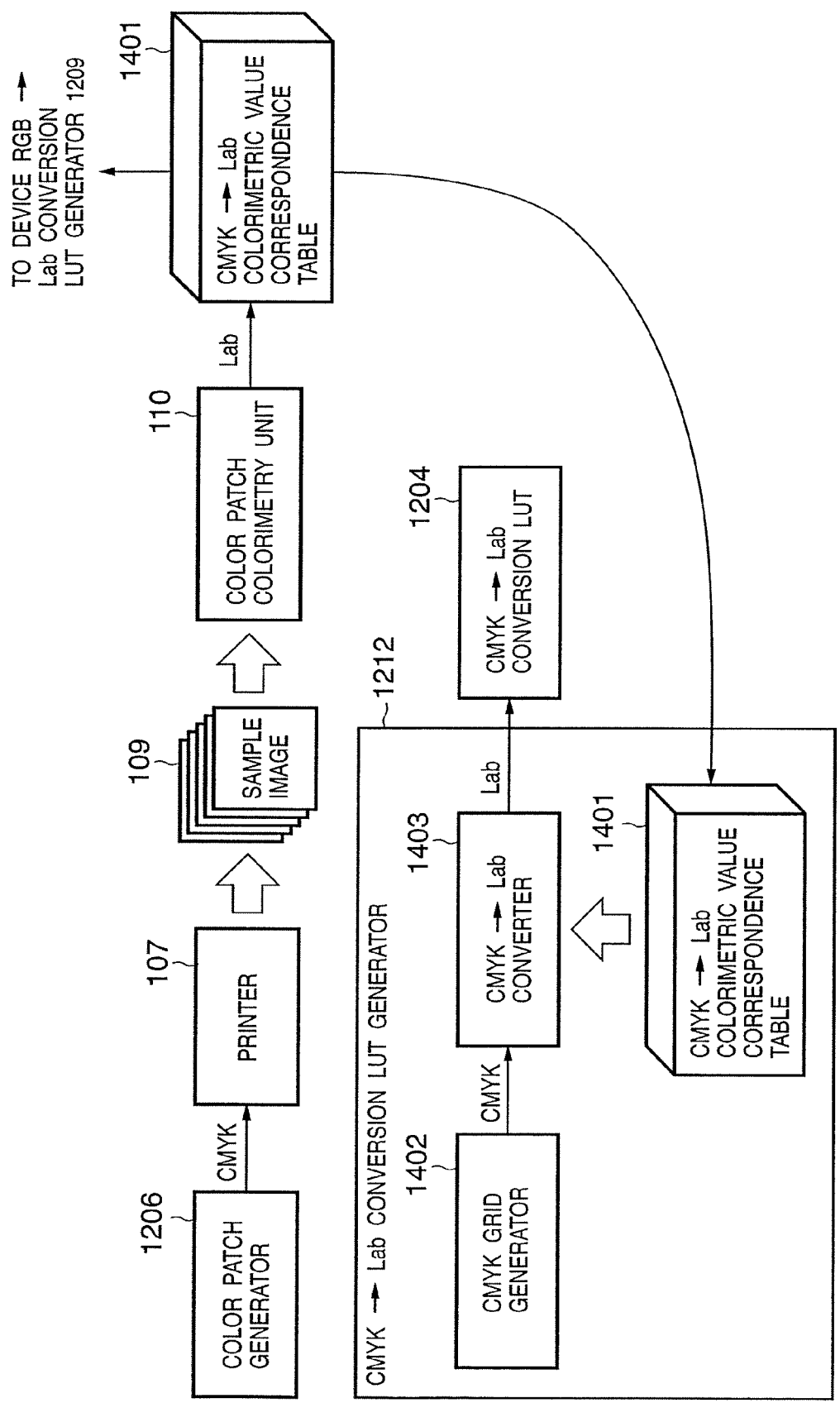
FIG. 15A is a block diagram showing the detailed operation of a patch generation/colorimetry system and CMYK→Lab conversion LUT generation in the fifth embodiment.

FIG. 15A is a block diagram for explaining the detailed operations of the patch generation/colorimetry system and CMYK→Lab conversion LUT generator 1212 in the fifth embodiment.

Referring to FIG. 15A, a CMYK→Lab colorimetric value correspondence table 1401 is obtained by measuring sample images 109, which are obtained by outputting CMYK images generated by the color patch generator 1206 to the printer 107, by the color patch colorimetry unit 110.

The color patch generator 1206 generates color patch images having, e.g., the following CMYK values:
4 C M Y K 0 0 0 0 32 0 0 0 64 0 0 0 . . . 224 255 255 255 255 255 255

In this case, each of C, M, and Y assumes values in 32-increments, and K assumes values in 51-increments, and color patches having 9×9×9×5 color values are generated. Of course, the CMYK values are not limited to those values. A combination of those CMYK values and colorimetric values (total of 9×9×9×5 values) of patches corresponding to the CMYK values corresponds to the CMYK→Lab colorimetric value correspondence table 1401.

The operation in the CMYK→Lab conversion LUT generator 1212 will be described in detail below. The CMYK→Lab conversion LUT generator 1212 comprises a CMYK grid generator 1402 and CMYK→Lab converter 1403, and generates the CMYK→Lab conversion LUT 1204 by looking up the CMYK→Lab colorimetric value correspondence table 1401 generated, as described above.

The CMYK grid generator 1402 generates combinations of CMYK values like those generated by the color patch generator 1206 in correspondence with the number of grids designated by the user. For example, C, M, Y, and K respectively assume values in 32-increments, and 9×9×9×9 CMYK values are generated. The generated CMYK values are input to the CMYK→Lab converter 1403, and are converted into Lab values by interpolation operations using the CMYK→Lab colorimetric value correspondence table 1401, which is obtained by patch generation/colorimetry. The converted Lab values are stored as the CMYK→Lab conversion LUT 1204 on the basis of information of the CMYK values generated by the CMYK grid generator 1402.

Figure 15B:
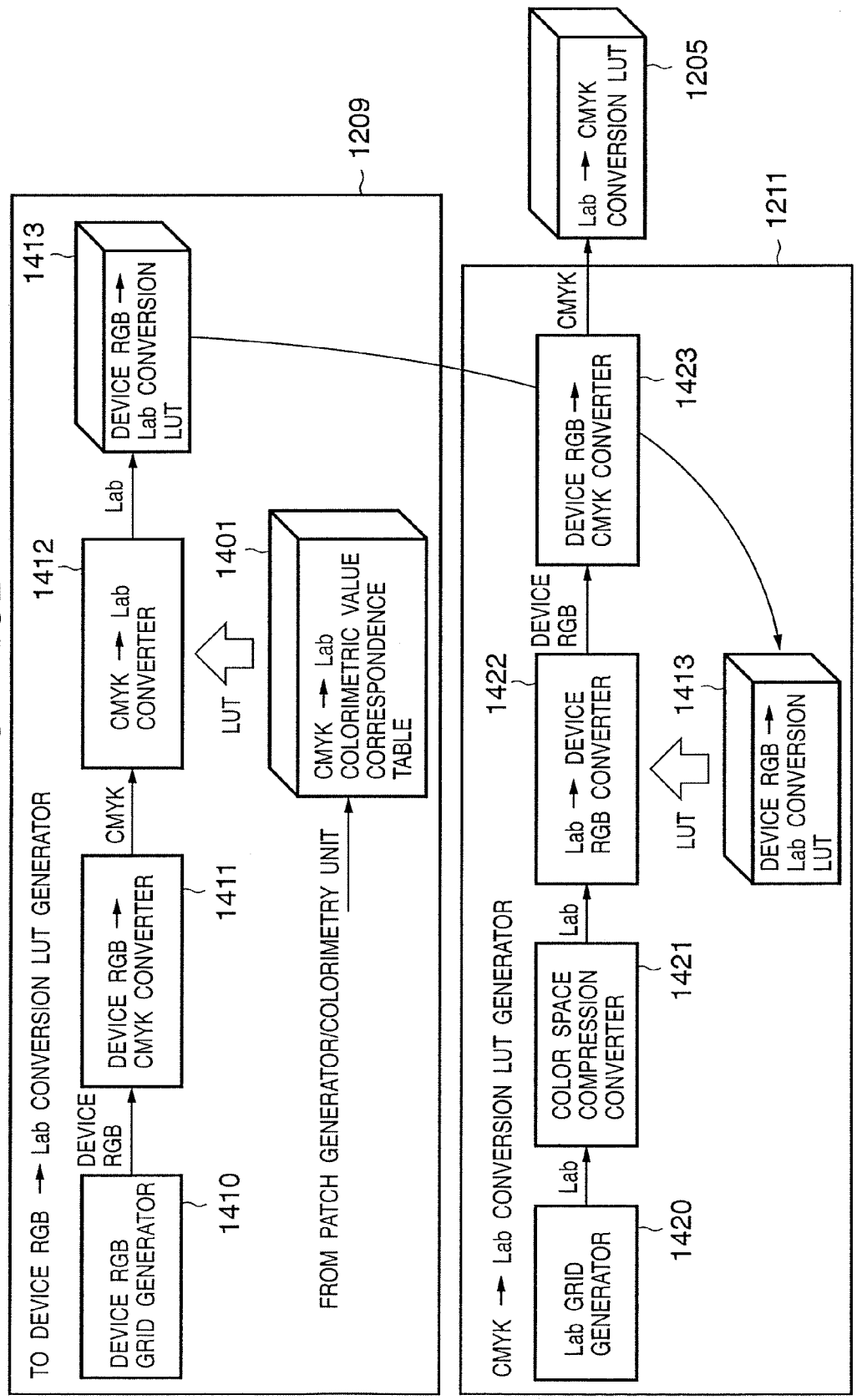
FIG. 15B is a block diagram showing the detailed operation of device RGB→Lab conversion LUT generation and Lab→CMYK conversion LUT generation in the fifth embodiment.

FIG. 15B is a block diagram for explaining the detailed operations of the device RGB→Lab conversion LUT generator 1209 and Lab→CMYK conversion LUT generator 1211 in the fifth embodiment.

Referring to FIG. 15B, in the device RGB→Lab conversion LUT generator 1209, a device RGB→CMYK converter 1411 converts RGB values generated by a device RGB grid generator 1410 into CMYK values, and a CMYK→Lab converter 1412 converts the CMYK values into Lab values by looking up the CMYK→Lab colorimetric value correspondence table 1401 obtained by patch generation/colorimetry shown in FIG. 15A. As the CMYK→Lab converter 1412, the CMYK→Lab converter 1403 as a module used in the CMYK→Lab conversion LUT generator 1212 may be commonly used.

If the device RGB grid generator 1410 generates RGB grid values:
5 R G B 0 0 0 0 0 32 0 0 64 . . . 255 255 224 255 255 255

Lab values corresponding to these grid values can be calculated. That is, Lab values equivalent to those obtained when RGB color patches are generated and are measured can be obtained.

The operation in the Lab→CMYK conversion LUT generator 1211 will be described in detail below. The Lab→CMYK conversion LUT generator 1211 comprises an Lab grid generator 1420, color space compression converter 1421, Lab→device RGB converter 1422, and device RGB→CMYK converter 1423, and generates the Lab→CMYK conversion LUT 1205 by looking up a device RGB→Lab conversion LUT 1413 generated by the device RGB→Lab conversion LUT generator 1209. As the device RGB→CMYK converter 1423, the device RGB→CMYK converter 1411 as a module used in the device RGB→Lab conversion LUT generator 1209 may be commonly used.

The Lab grid generator 1420 generates Lab grid values based on the number of grids designated by the user. For example, if an Lab value is processed as an 8-bit signal and the user designates 17×17×17 as the number of grids, L*, and a* and b* assume values in 16-increments within the range from 0 to 255 (*L) and the range from −128 to 127 (a*, b*), and 4913 (=17×17×17) Lab grid values are generated. The Lab values generated in this way are converted into CMYK values by the color space compression converter 1421, which can commonly use the color space compression converter 103 of the first embodiment, the Lab→device RGB converter 1422, and the device RGB→CMYK converter 1411 which can commonly use the device RGB→CMYK converter 106 of the first embodiment. The converted CMYK values are stored as the Lab→CMYK conversion LUT 1205 together with information of the Lab grids generated by the Lab grid generator 1420.

Figure 16:
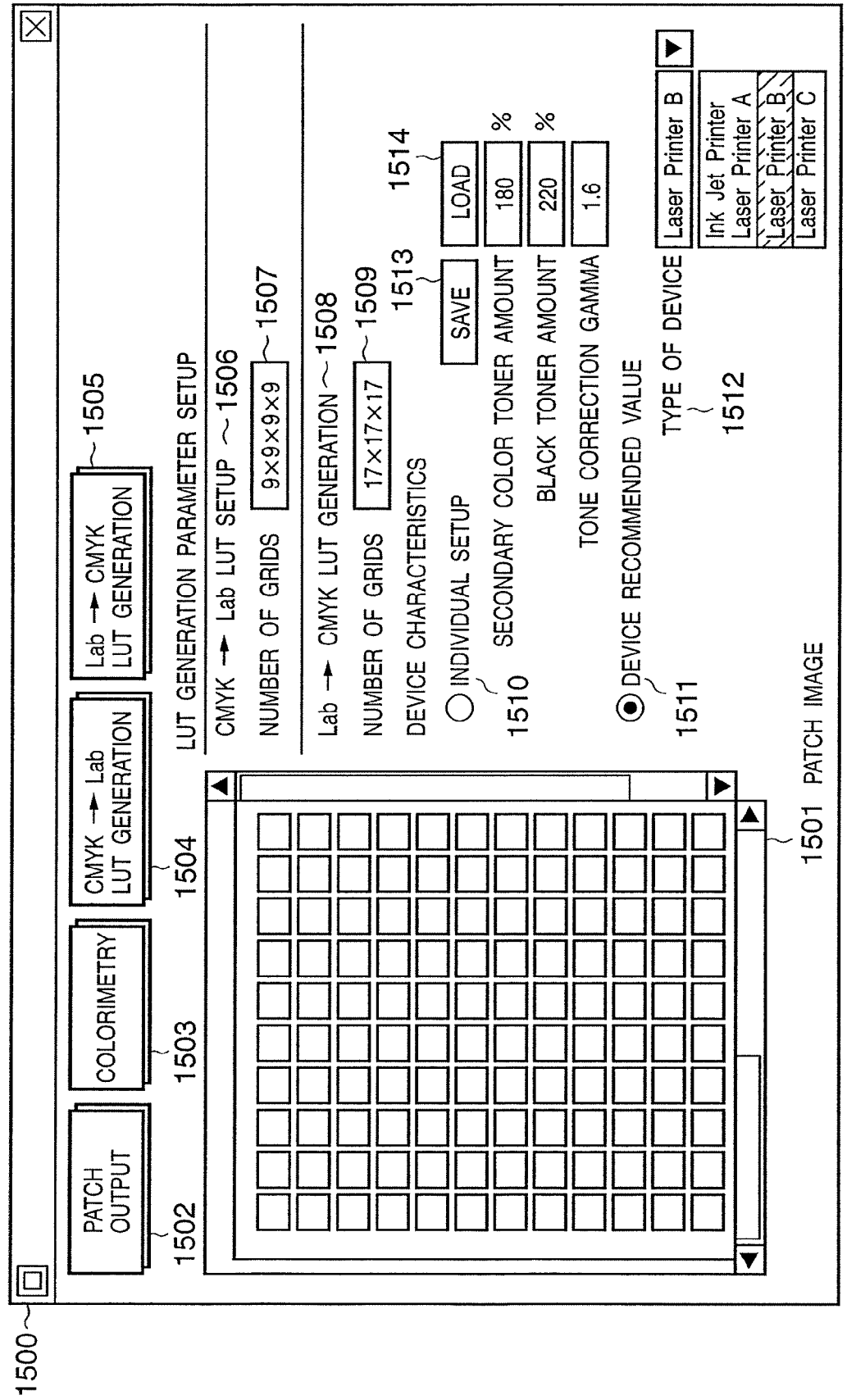
FIG. 16 shows an example of a GUI in the fifth embodiment.

FIG. 16 shows an example of a user interface (UI) used to control the processes of the fifth embodiment, and this UI is displayed on the monitor 1314 via the video I/F 1313 on the computer system shown in FIG. 14.

A GUI 1500 shown in FIG. 16 has a view 1501 used to display a patch image output from the color patch generator 1206. The view 1501 is used to confirm if patch generation in the color patch generator 1206 is normal. Buttons 1502 to 1505 are respectively, patch output, colorimetry, CMYK→Lab conversion LUT generation, and Lab→CMYK conversion LUT generation instruction buttons, and are used to instruct the start of respective processes.

Upon generating an LUT, the number of grids of the CMYK→Lab conversion LUT can be set using a grid number setting box 1507 in a CMYK→Lab conversion LUT setting field 1506. This box may be prepared as, e.g., a pull-down menu to allow the user to select the number of grids from 9×9×9×9, 17×17×17×17, and the like.

In an Lab→CMYK conversion LUT setting field 1508, the device characteristics of an output printer can be set in addition to setting of the number of grids using a grid number setting box 1509. In a device characteristic individual setting field 1510, a secondary color toner amount, black toner amount, and tone correction gamma can be set as numerical values, which are respectively set as parameters col2, col4, and γ described in the fourth embodiment, and are used as parameters upon conversion in the device RGB→CMYK converter 1411 (1423). These individual setting values can be saved using a device characteristic save button 1513, and the saved setting values can be loaded and used again upon depression of a device characteristic load button 1514.

When the user wants to obtain recommended values of the device characteristics, he or she can designate the type of device in a device recommended value setting field 1511. That is, device names, and secondary color toner amounts, black toner amounts, and tone correction gamma values suitable for these devices are pre-stored for a plurality of selectable devices. When the user designates the device name, an appropriate secondary color toner amount, black toner amount, and tone correction gamma corresponding to that device name are automatically set. Note that the set values may be displayed in setting columns of the individual setting field 1510.

Note that the individual setup and device recommended value setup can be exclusively designated using check buttons. When one setup is designated, the other setup is grayed out, and the user can easily recognize the selected state.

FIGS. 17A to 17E are flow charts respectively showing processes when operations are instructed upon depression of the patch output button 1502, colorimetry button 1503, CMYK→Lab conversion LUT generation button 1504, and Lab→CMYK conversion LUT generation button 1505 on the GUI 1500.

Figure 17A:
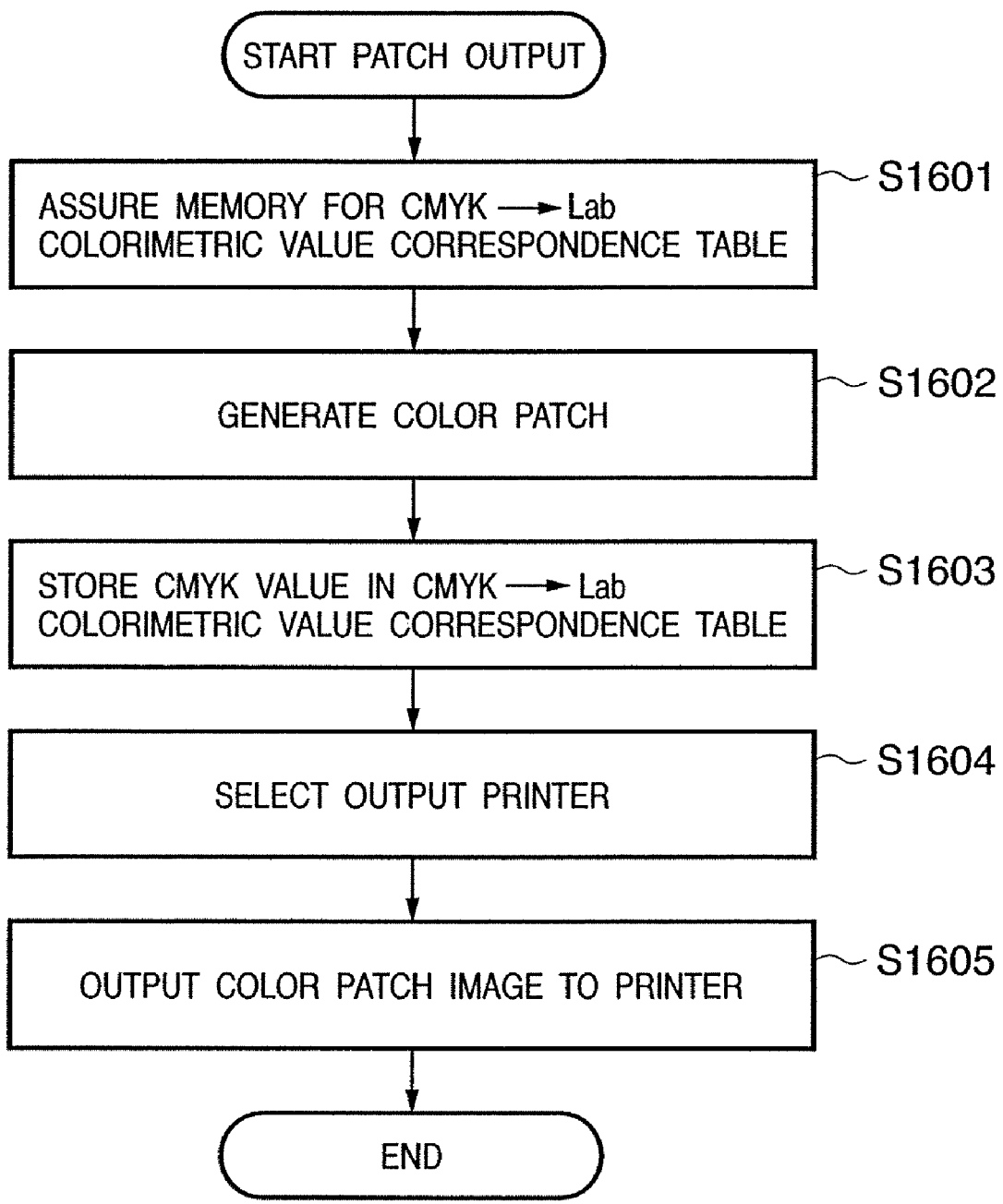
FIG. 17A is a flow chart showing a patch output process of the fifth embodiment.

FIG. 17A is a flow chart of a patch output process (FIG. 15A) which starts upon depression of the patch output button 1502. This process is executed by the color patch generator 1206 and printer 107. After a memory area for storing the CMYK→Lab colorimetric value correspondence table 1401 is assured in step S1601, CMYK values indicating color patches are generated in step S1602, and are stored in the CMYK→Lab colorimetric value correspondence table 1401 in step S1603. The printer 107 as an output target is selected in the device recommended value setting field 1511 in step S1604, and the CMYK values of the color patches are output to the selected printer 107 in step S1605, thus outputting sample images 109 from the printer 107.

Figure 17B:
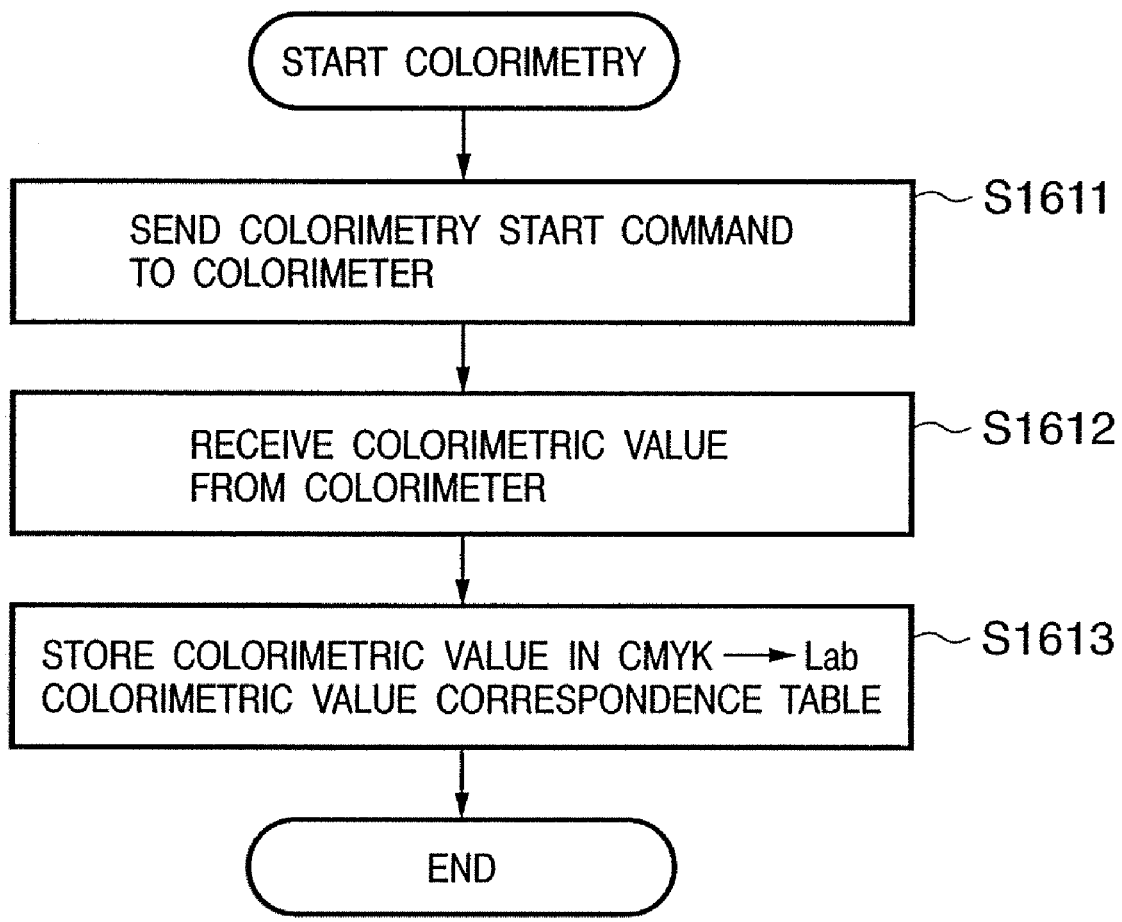
FIG. 17B is a flow chart showing a colorimetry process of the fifth embodiment.

After the sample images 109 are obtained, the colorimetry process of the sample images 109 (FIG. 15A) starts upon depression of the colorimetry button 1503. FIG. 17B is a flow chart showing the colorimetry process, which is executed by the color patch colorimetry unit 110. The sample images 109 output from the printer 107 are set in the color patch colorimetry unit 110 (color calorimeter 1310), and the colorimetry button 1503 is then pressed. A command that instructs to start colorimetry is sent to the color colorimeter 1310 via the serial I/F 1309 in step S1611, and colorimetric values are received from the color colorimeter 1310 in step S1612. In step S1613, the colorimetric values are stored in the CMYK→Lab colorimetric value correspondence table 1401, thus completing this table 1401.

The generation processes of respective LUTs will be explained below.

Figure 17C:
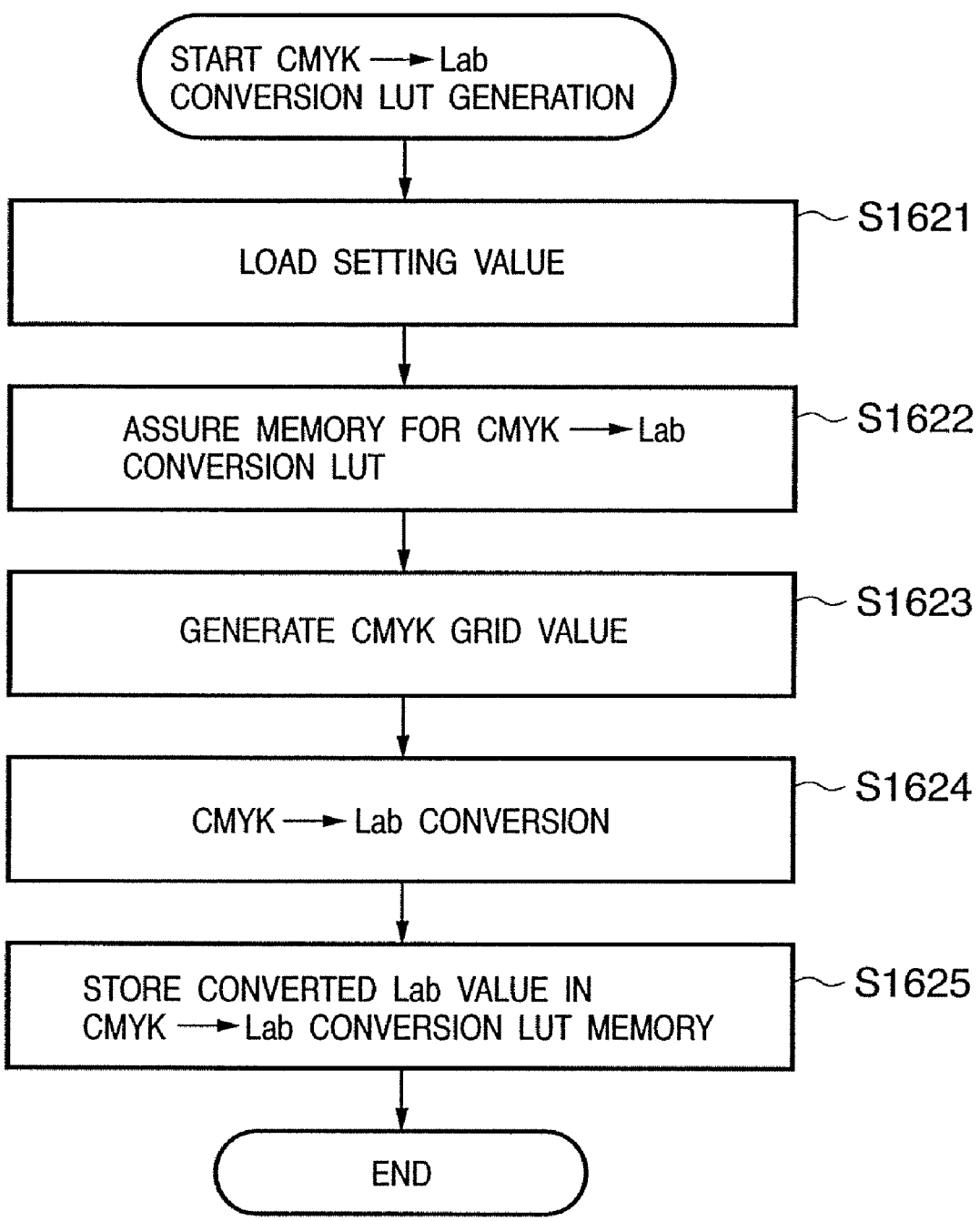
FIG. 17C is a flow chart showing a CMYK→Lab conversion LUT generation process of the fifth embodiment.

FIG. 17C is a flow chart of the CMYK→Lab conversion LUT generation process (FIG. 15A) which starts upon depression of the CMYK→Lab conversion LUT generation button 1504. This process is executed by the CMYK→Lab conversion LUT generator 1212.

The number of grids set in the grid number setting box 1507 is checked in step S1621, and a memory area for storing the CMYK→Lab conversion LUT 1204 is assured in correspondence with the number of grids in step S1622. CMYK grid values corresponding to the number of grids are generated in step S1623, and are converted into Lab values in step S1624. The Lab values are stored in the CMYK→Lab conversion LUT 1204 in step S1625, thus completing this LUT 1204.

Figure 17D:
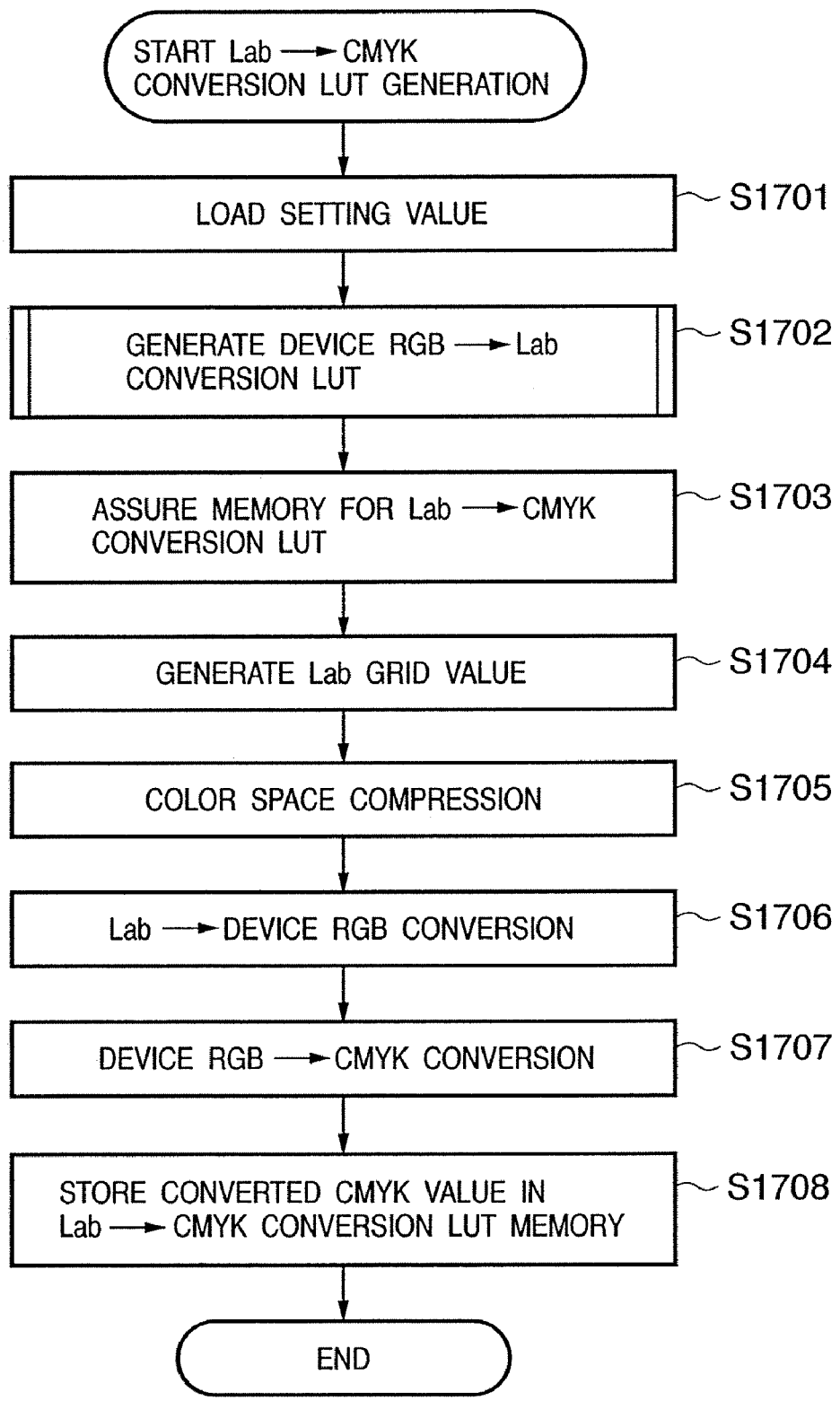
FIG. 17D is a flow chart showing a Lab→CMYK conversion LUT generation process of the fifth embodiment.
Figure 17E:
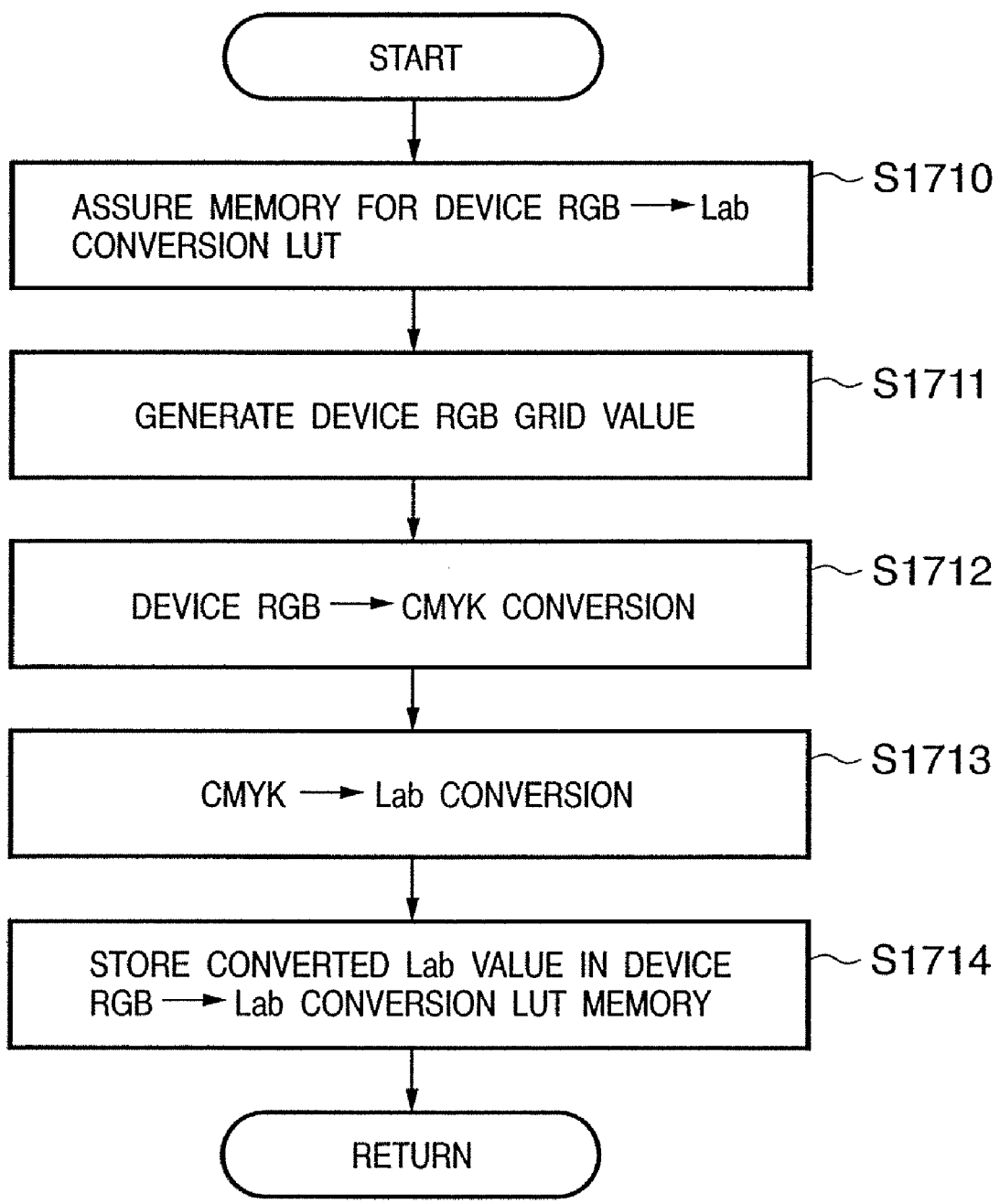
FIG. 17E is a flow chart showing a device RGB→Lab conversion LUT generation process of the fifth embodiment.

FIGS. 17D and 17E are flow charts of the Lab→CMYK conversion LUT generation process (FIG. 15B) which starts upon depression of the Lab→CMYK conversion LUT generation button 1505. This process is executed by the device RGB→Lab conversion LUT generator 1209 and Lab→CMYK conversion LUT generator 1211.

In step S1701, respective setting values (the number of grids, secondary toner amount, black toner amount, and tone correction gamma value) in the conversion LUT generator setting field 1508 are acquired and stored. In step S1702, the generation process of the device RGB→Lab conversion LUT 1413 starts.

Details of the device RGB→Lab conversion LUT generation process will be described below with reference to FIG. 17E. In step S1710, a memory area for storing the device RGB→Lab conversion LUT 1413 is assured. In step S1711, device RGB grid values are generated and are stored in the device RGB→Lab conversion LUT 1413. Then, Lab values obtained via device RGB→CMYK conversion (step S1712) and CMYK→Lab conversion (step S1713) are stored in the device RGB→Lab conversion LUT 1413 in step S1714, thus completing this LUT 1413.

After the device RGB→Lab conversion LUT 1413 is obtained in step S1702, a memory area for storing the Lab→CMYK conversion LUT 1205 is assured in correspondence with the number of grids set in the grid number setting box 1509 in step S1703. In step S1704, Lab grid values corresponding to the number of grids are generated. The Lab grid values are converted into CMYK values via color space compression (step S1705), Lab→device RGB conversion (step S1706), and device RGB→CMYK conversion (step S1707), and are stored in the Lab→CMYK conversion LUT 1205 in step S1708, thus completing this LUT 1205.

As described above, according to the fifth embodiment, since the profiles of the output device can be appropriately generated, an appropriate proof process can be done.

Sixth Embodiment

An image processing apparatus according to the sixth embodiment of the present invention will be described below.

As has been explained in the first embodiment previously, it is desirable in Lab→device RGB conversion that the colorimetric value distribution of RGB patches has a uniform density independently of lightness. Hence, in the first embodiment, the number of samples of Lab values used in calculation is increased in a low-lightness region where the colorimetric value distribution is dense, and the number of samples is decreased in a high-lightness region where the colorimetric value distribution is coarse.

To achieve the same object, the parameter γ in device RGB→CMYK conversion explained in the fourth and fifth embodiments can be adjusted to an appropriate value. As a result of adjustment, the colorimetric value distribution, which is dense in the low-lightness region, as shown in FIG. 5, can be obtained as the distribution independently of lightness, as shown in FIG. 12, as has already been described above.

In the fifth embodiment, the user sets the parameter γ via the GUI. However, the sixth embodiment is characterized by the parameter γ being set automatically.

Figure 18:
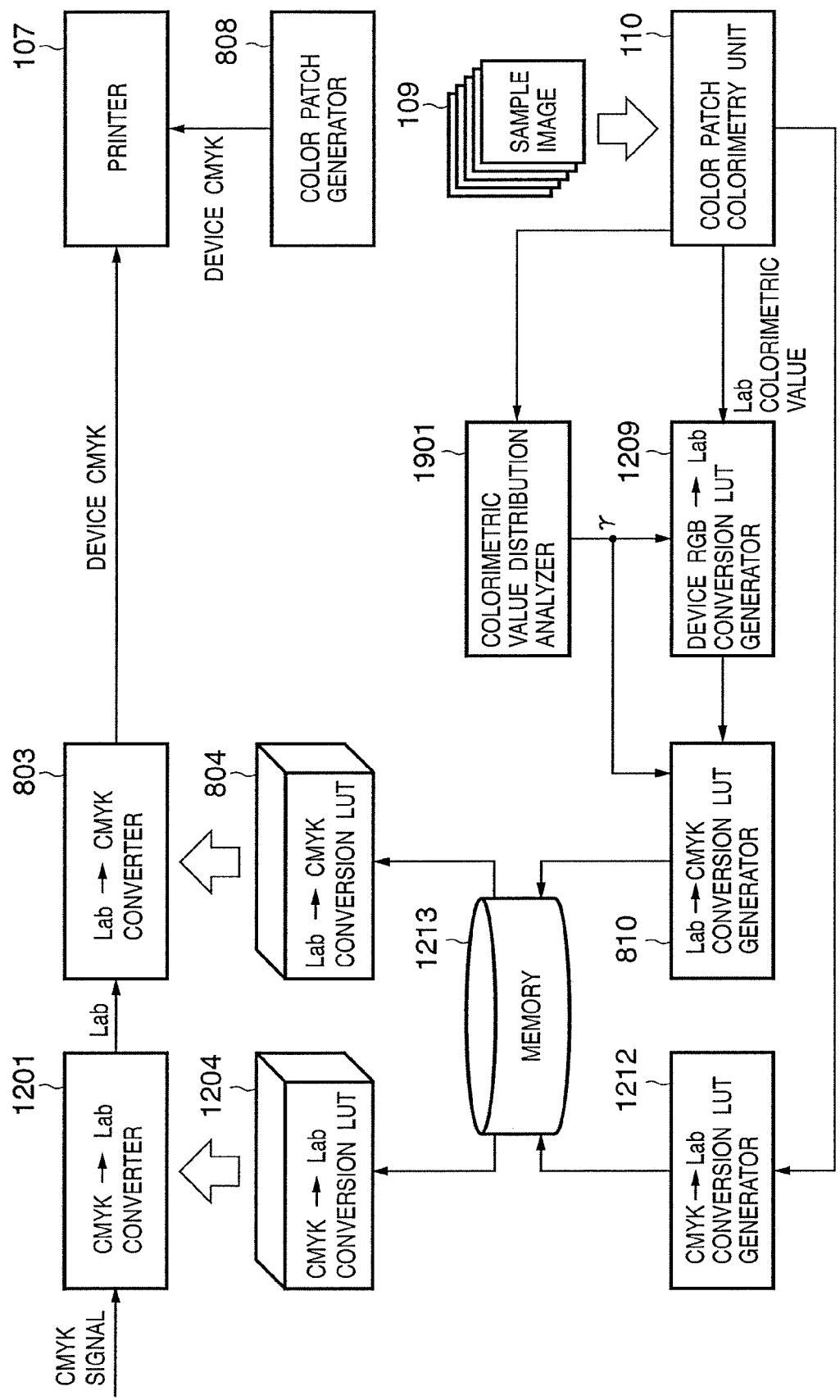
FIG. 18 is a block diagram showing the arrangement of an image processing apparatus according to the sixth embodiment.

FIG. 18 is a block diagram showing the arrangement of an image processing apparatus of the sixth embodiment. This apparatus by a colorimetric value distribution analyzer 1901 for automatically setting the parameter γ by analyzing Lab colorimetric values corresponding to CMYK color patches being arranged in addition to the arrangement of the fifth embodiment shown in FIG. 13. Since other arrangements are the same as those in the fifth embodiment, the same reference numerals denote the same parts, and a detailed description thereof will be omitted.

Figure 19:
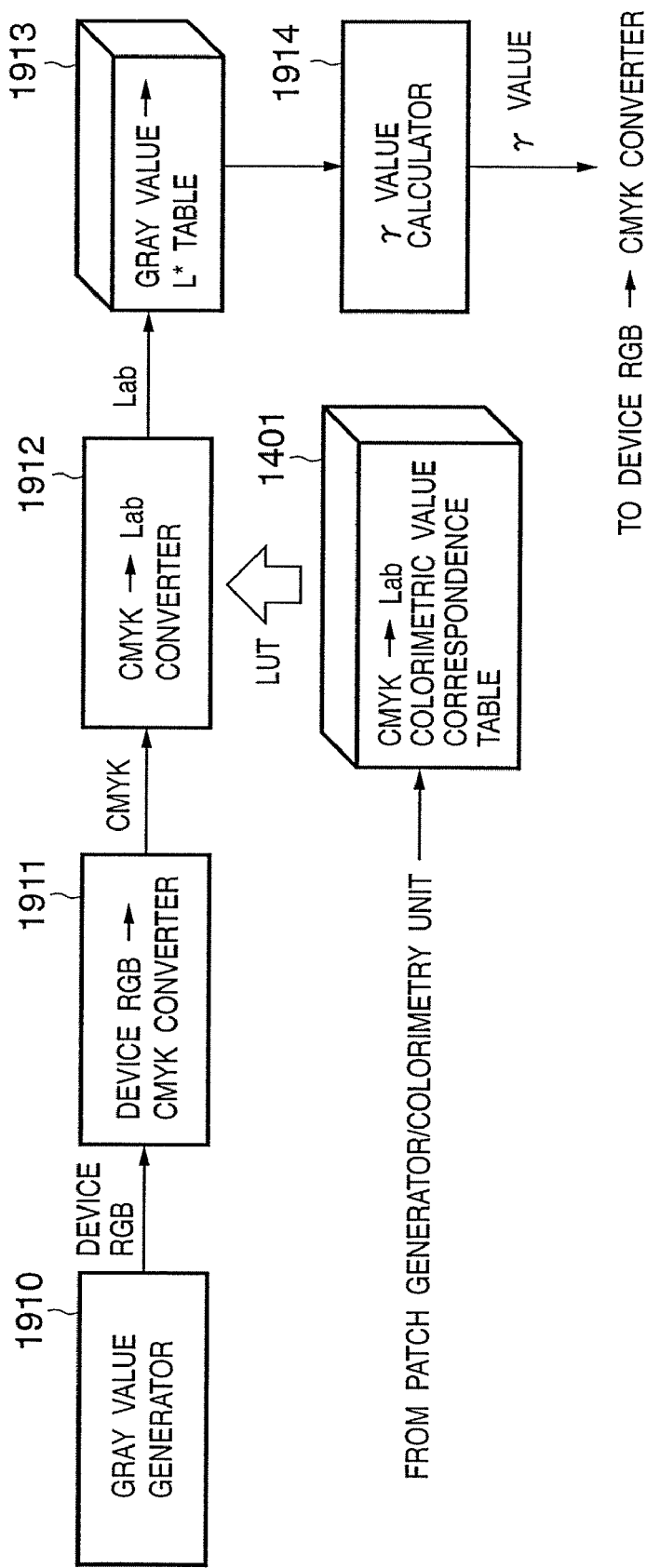
FIG. 19 is a block diagram showing the detailed arrangement of a colorimetric value distribution analyzer of the sixth embodiment.

FIG. 19 is a block diagram showing the detailed arrangement of the colorimetric value distribution analyzer 1901. Referring to FIG. 19, a gray value generator 1910 generates a plurality of gray values (R=G=B), and passes them to a device RGB→CMYK converter 1911. CMYK values converted by this converter are converted into Lab values by a CMYK→Lab converter 1912 on the basis of the CMYK→Lab colorimetric value correspondence table 1401 (FIG. 15A) generated by the color patch colorimetry unit 110, thus forming a gray value→L* table 1913. A γ value calculator 1914 calculates an appropriate γ value (to be described later) on the basis of the gray value→L* table 1913. The obtained γ value is supplied to the device RGB→Lab conversion LUT generator 1209 and Lab→CMYK conversion LUT generator 1211, and is set as a parameter for the device RGB→CMYK converters 1411 and 1423.

As the device RGB→CMYK converter 1911, the device RGB→CMYK converter 1411 (FIG. 15B) as a module in the RGB→CMYK conversion LUT generator 1209 in the fifth embodiment may be commonly used. Likewise, as the CMYK→Lab converter 1912, the CMYK→Lab converter 1403 as a module in the CMYK→Lab conversion LUT generator 1212 (FIG. 15A) may be commonly used.

The Lab→CMYK conversion LUT generation process (FIG. 15B) in the sixth embodiment will be explained below. This process is executed by the device RGB→Lab conversion LUT generator 1209 and Lab→CMYK conversion LUT generator 1211, and its outline is the same as that shown in FIG. 17D described in the fifth embodiment. In the sixth embodiment, the device RGB→Lab conversion LUT generation process in step S1702 in FIG. 17D is different from that in the fifth embodiment, and details of this process are shown in the flow chart of FIG. 20.

Figure 20:
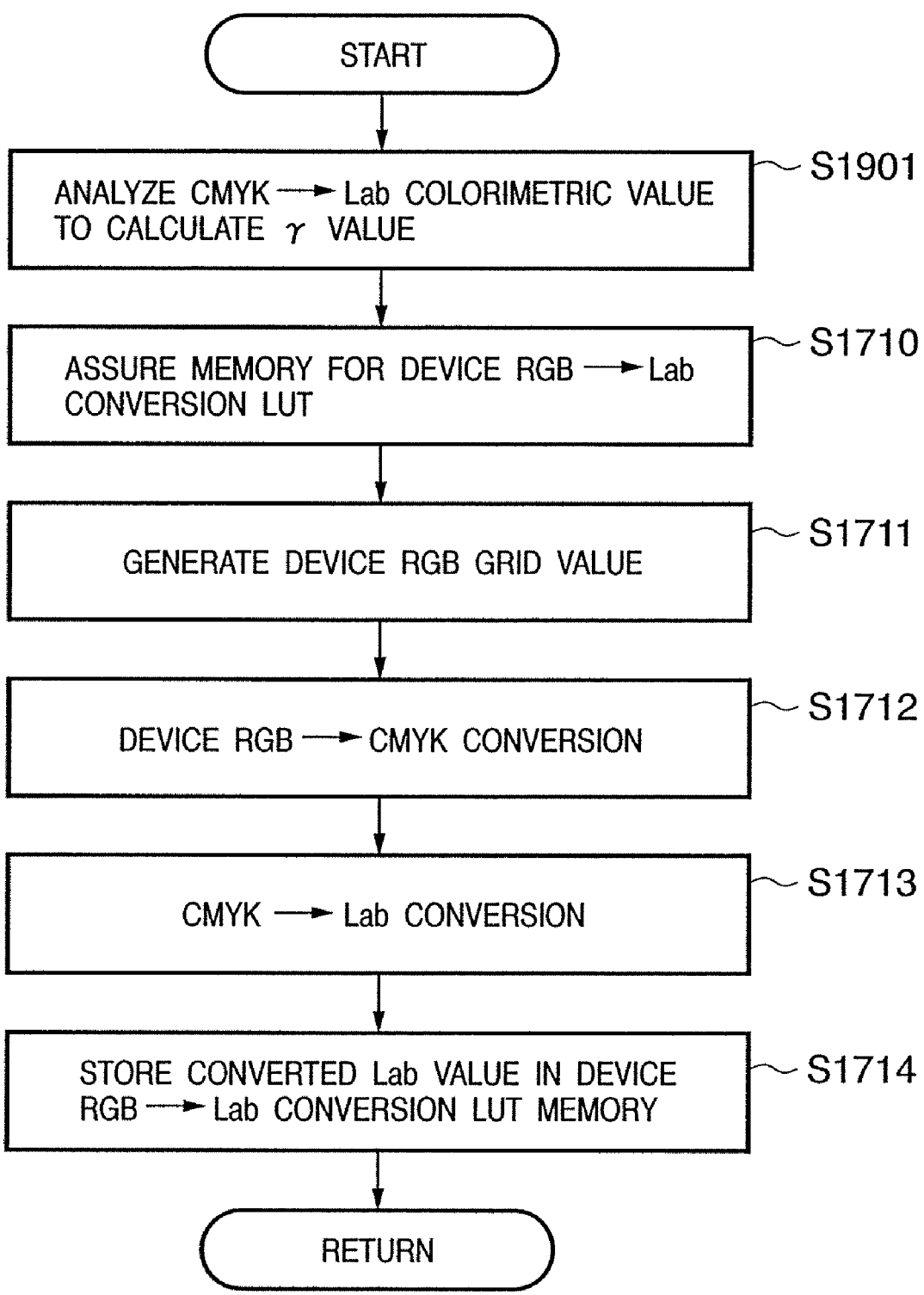
FIG. 20 is a flow chart showing a device RGB→Lab conversion LUT generation process upon executing an Lab→CMYK conversion LUT generation process of the fifth embodiment.

As shown in FIG. 20, the sixth embodiment is characterized by colorimetric values being analyzed in step S1801 immediately after the beginning of the Lab→CMYK conversion LUT generation process to determine a γ value, and the subsequent processes are the same as those in FIG. 17E.

Figure 21:
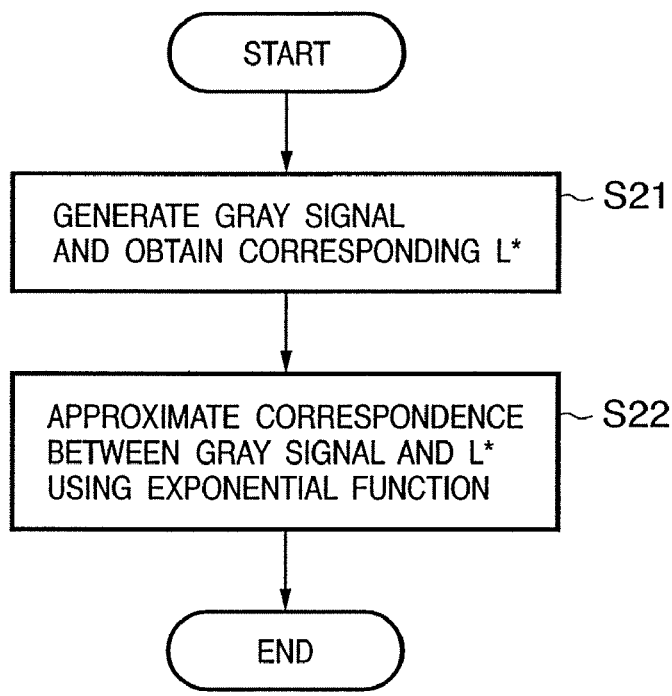
FIG. 21 is a flow chart showing a gamma value calculation method based on colorimetric value distribution analysis of the sixth embodiment.

The γ value calculation method in the colorimetric value distribution analyzer 1901 will be described in detail below with reference to the flow chart of FIG. 21.

Step S21

A gray signal is generated by the gray value generator 1910, and an L* value corresponding to that gray signal is obtained.

For example, the gray value generator 1910 generates a plurality of gray signals like R=G=B=0, 16, 32, ..., 255, and the device RGB→CMYK converter 1911 converts these gray signals into CMYK values. At this time, γ=1.0 is set as a parameter in the device RGB→CMYK converter 1911, and col2 and col4 use values designated via the GUI of the fifth embodiment.

Figure 22:
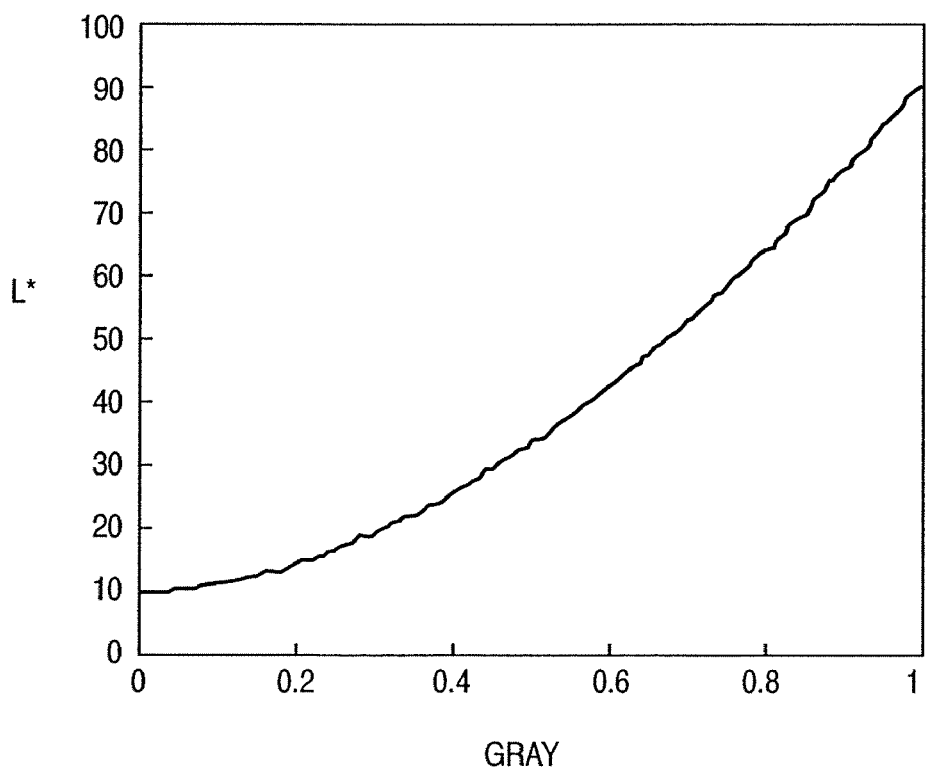
FIG. 22 is a graph showing the relationship between a gray signal and L* value.

The converted CMYK values are converted into Lab values by the CMYK→Lab converter 1912. In this manner, Lab values corresponding to the gray signals are obtained. FIG. 22 is a graph formed by normalizing gray signals to [0:1] and plotting corresponding L* values, and this graph is the gray value→L* table 1913.

Step S22

The correspondence (gray value→L* table 1913) between the gray signals and L* values shown in FIG. 22 is approximated by an exponential function.

L* is normalized by [0:1] by $L^{*\prime}=(L^*-L^*min)/(L^*max-L^*min)$. The normalized gray-$L^{*\prime}$ curve is approximated by an exponential function by a known function fitting method to obtain a γ value.

When the γ value obtained in this way is set as a parameter of the device RGB→CMYK converters 1411 and 1423, the distribution of Lab values becomes uniform with respect to L* values in the device RGB→Lab conversion LUT 1412 obtained by the device RGB→Lab conversion LUT generator 1209, and the Lab→CMYK conversion LUT 1205 obtained by the Lab→CMYK conversion LUT generator 1211.

When the tone characteristics are corrected by a polynomial in place of γ conversion, the same effect can be obtained if an arithmetic operation is made to fit the obtained gray signal-L* curve into the polynomial.

As described above, according to the sixth embodiment, the parameter .gamma. used in device RGB→CMYK conversion can be automatically set to be an appropriate value.

Seventh Embodiment

An image processing apparatus according to the seventh embodiment of the present invention will be described below.

In general, upon image formation based on CMYK, control of the ratio of Bk color, i.e., the black generation amount, is important. As a typical control method of the black generation amount, an ink (or toner) amount of black, i.e., Bk is set to be small in a low-density region, and is increased toward a high-density region. In this way, an image which can maintain color vividness in the low-density region, and is sharp in the high-density region can be obtained.

On the other hand, control parameters of device RGB→CMYK conversion described in each of the above embodiment are only eight toner amounts at eight points R, G, B, C, M, Y, W, and Bk as interpolation lattice points on the CMY space, and the γ parameter in γ conversion of C, M, and Y values serving as inputs to the CMY space on which the interpolation operation is made. At this time, since the output CMYK value is calculated by a linear interpolation operation in the CMY space, respective color components of the output CMYK value with respect to the input CMYK value simultaneously change linearly, and it is impossible to independently control the Bk color component alone.

Hence, the seventh embodiment, as a modification of the above embodiments, is characterized by independent control of a Bk color component being allowed in the device RGB→CMYK conversion process (e.g., RGB→CMYK converters 1411 and 1423 in FIG. 15B) in each of the above embodiments.

The processes other than those to be described below are the same as the processes in each of the above embodiments.

Figure 23:
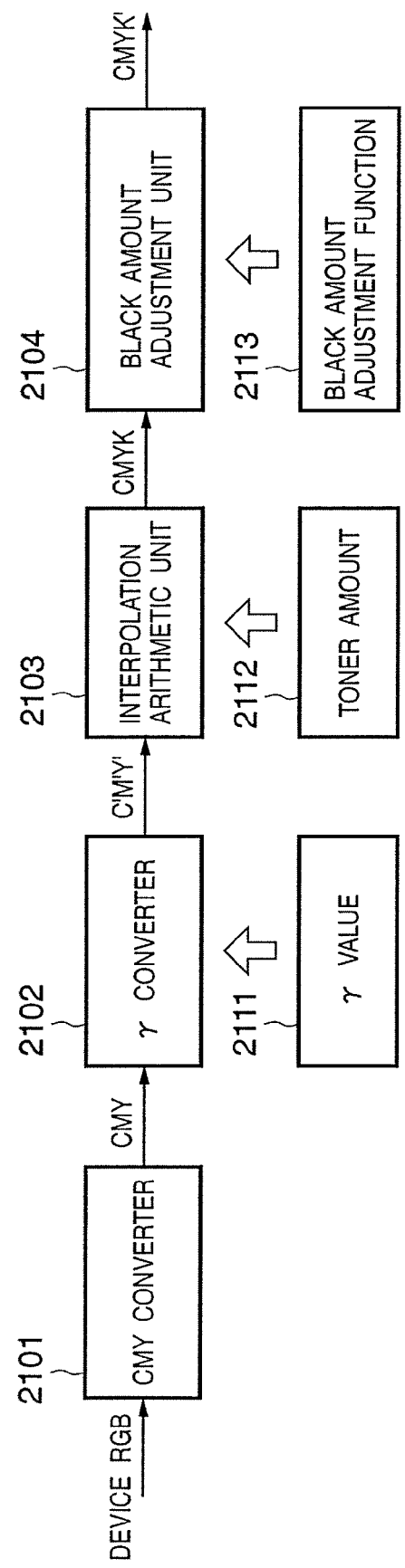
FIG. 23 is a block diagram showing the detailed arrangement of a device RGB→CMYK converter in the seventh embodiment.

FIG. 23 is a block diagram showing the detailed arrangement of a device RGB→CMYK converter in the seventh embodiment. Referring to FIG. 23, a CMY converter 2101 inverts an input RGB value by:

$$C=1.0-R$$

$$M=1.0-G$$

$$Y=1.0-B$$

A γ converter 2102 then executes γ-conversion of the converted CMY value using an arbitrary γ value or a γ value 2111 automatically set in the sixth embodiment by:

$$C'=C^\gamma$$

$$M'=M^\gamma$$

$$Y'=Y^\gamma$$

An interpolation arithmetic unit 2103 makes an interpolation operation of the C'M'Y' signal using a value 2112, which is set based on toner amount limitation that defines eight lattice points in the CMY space, as in the fourth embodiment, thereby calculating a CMYK value.

A black amount adjustment unit 2104 as a characteristic feature of the seventh embodiment executes black amount adjustment using a black amount adjustment function 2113 for the calculated CMYK value. A black amount adjustment process according to the seventh embodiment will be described in detail below.

Figure 24:
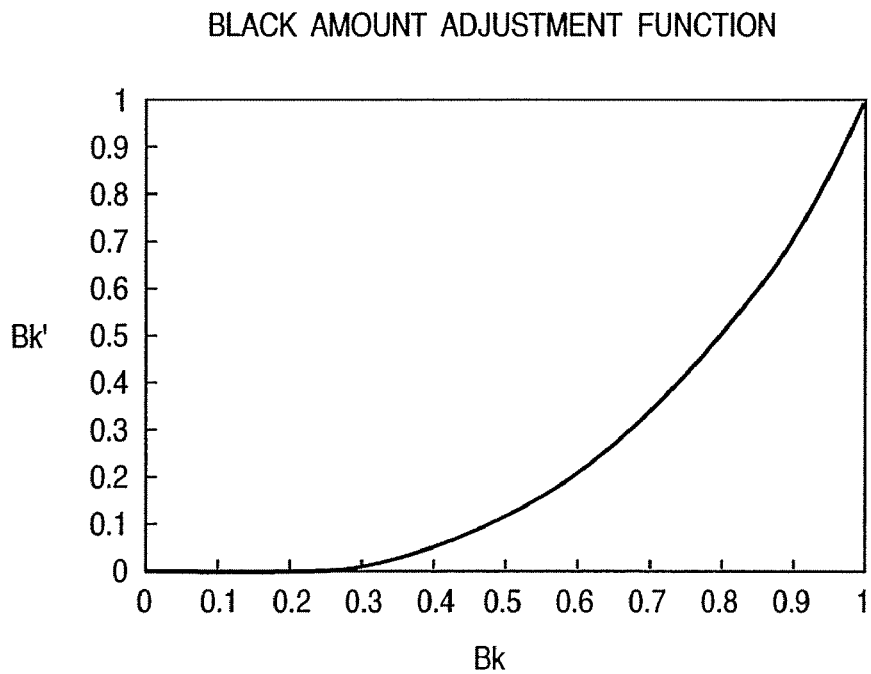
FIG. 24 is a graph showing an example of a black amount adjustment function in the seventh embodiment.

FIG. 24 shows an example of the black amount adjustment function 2113. In FIG. 24, the abscissa plots a Bk value before conversion, and the ordinate plots a Bk' value after conversion. The black amount adjustment function 2113 shown in FIG. 24 is a cubic power function given by:

$$Bk'=Bk^3$$

If Bk undergoes conversion based on this function, Bk is controlled to decrease the Bk generation amount in a low-density region where the Bk amount is small, and to abruptly increase the Bk generation amount toward a high-density region. In order to control the Bk generation amount more flexibly, when a plurality of black amount adjustment functions 2113 are held in the form of LUTs, it is effective to select a non-analytic function or free curve in addition to the above power function.

Figure 25:
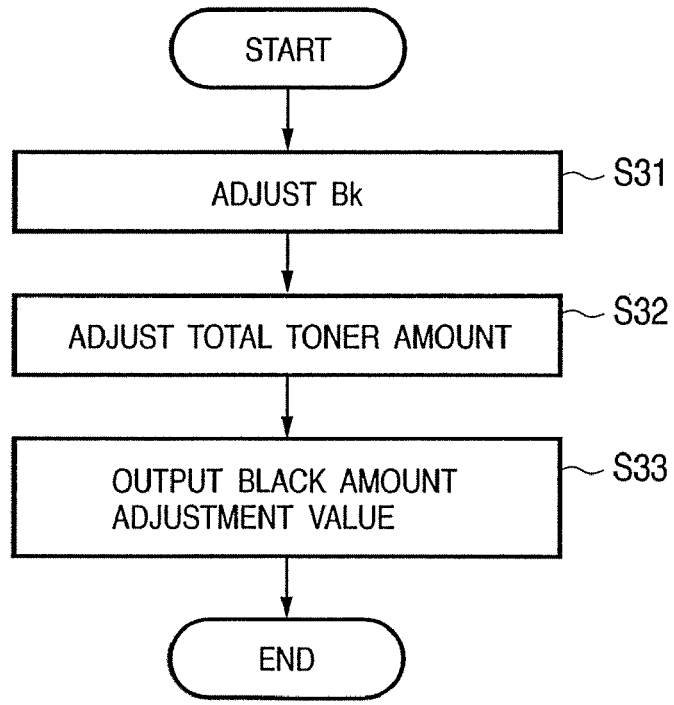
FIG. 25 is a flow chart showing a black amount adjustment process in the seventh embodiment.

The black amount adjustment process in the black amount adjustment unit 2104 will be described in detail below with reference to the flow chart of FIG. 25.

Step S31

Bk adjustment for converting a Bk value of the CMYK value calculated by the interpolation operation is made using the black amount adjustment function 2113. That, if F(x) represents the black amount adjustment function 2113, the following arithmetic operation is made:

$$Bk\_new=F(Bk)$$

Step S32

The Bk amount decreased in step S31 is distributed and added to other C, M, and Y values to maintain the total toner amount obtained by the interpolation operation. The addition method is described by:

$$C\_new=C+(Bk\_new-Bk)\times C/(C+M+Y)$$

$$M\_new=M+(Bk\_new-Bk)\times M/(C+M+Y)$$

$$Y\_new=Y+(Bk\_new-Bk)\times Y/(C+M+Y)$$

Note that the decreased Bk amount need not always be distributed to C, M, and Y in correspondence with their amounts. In some cases, a value obtained by equally dividing the decreased Bk amount may be added to each color by:

$$C\_new=C+(Bk\_new-Bk)/3$$

$$M\_new=M+(Bk\_new-Bk)/3$$

$$Y\_new=Y+(Bk\_new-Bk)/3$$

Step S33

C_new, M_new, Y_new, and Bk_new obtained in steps S31 and S32 are output as CMYK' after black amount adjustment.

In this way, the seventh embodiment generates a conversion condition (RGB→CMYK conversion process) for converting device-dependent color data (device-dependent RGB) specified by a plurality of color component data that do not include a black component into device-dependent color data (CMYK) specified by a plurality of color component data that include a black component on the basis of the tone gamma, total toner amount (print medium total amount condition), and black amount adjustment condition, and then generates a device RGB→Lab conversion LUT and Lab→CMYK conversion LUT.

Therefore, not only the tone gamma and total toner amount but also the black amount can be arbitrarily adjusted.

Black amount adjustment is done by the aforementioned steps. These modules are implemented as a program which runs on a computer system, as shown in FIG. 14, as in the fifth embodiment, and operate in collaboration with modules corresponding to, e.g., respective processors shown in FIG. 13.

Figure 26:
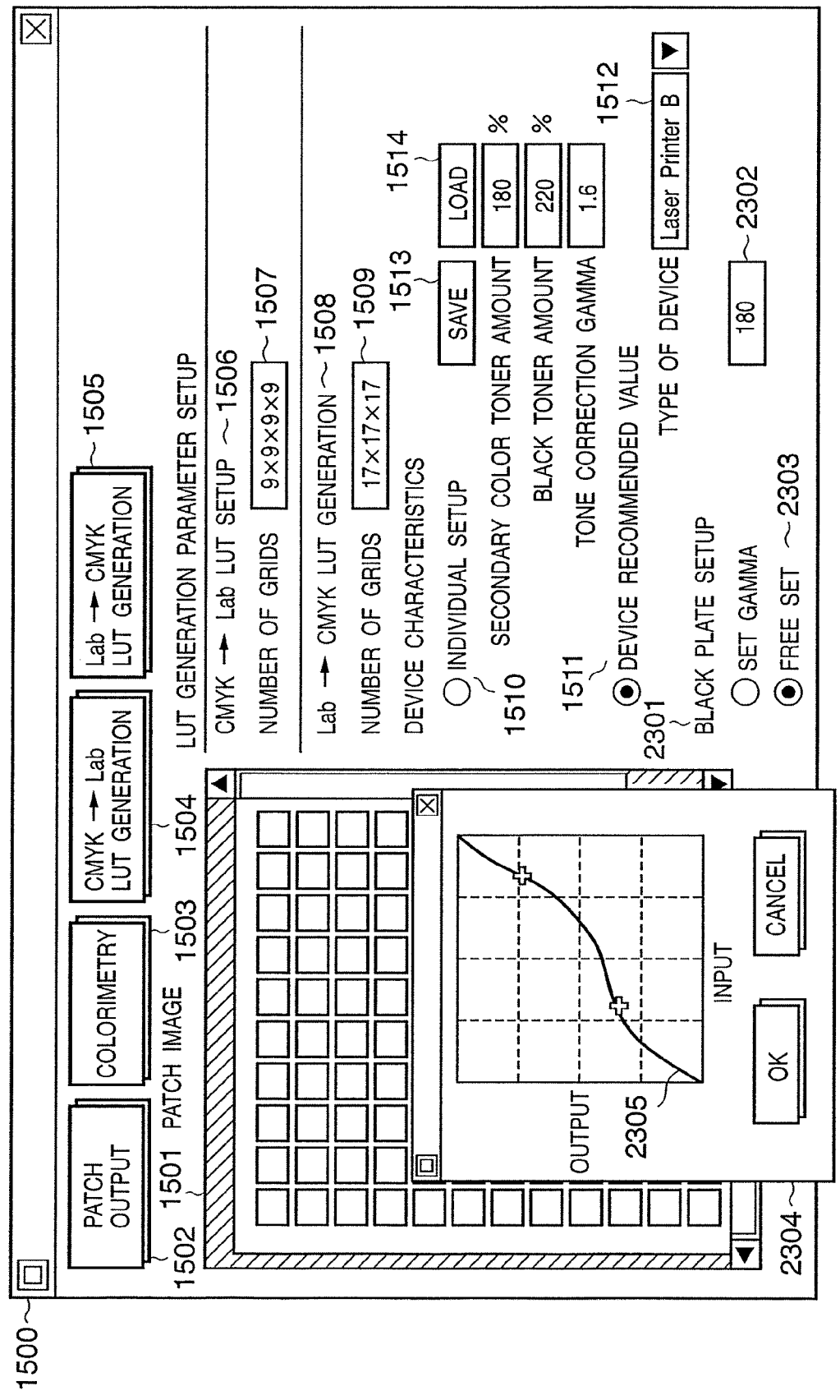
FIG. 26 shows an example of a GUI in the seventh embodiment.

FIG. 26 shows an example of a user interface (UI) provided by the program of the seventh embodiment. A UI component used to control the black amount adjustment process is added to the GUI window shown in FIG. 16 in the fifth embodiment. The UI shown in FIG. 26 will be explained below.

The same reference numerals in FIG. 26 denote the same items as those in FIG. 16, and a description thereof will be omitted. FIG. 26 is characterized by a black plate characteristic setting field 2301 being added to the GUI example shown in FIG. 16. Based on the setup on this field 2301, a function form of the black amount adjustment function 2113 used to adjust the Bk generation amount in the seventh embodiment is set.

On the black plate characteristic setting field 2301, a "set gamma" button 2302 is used to set a γ value in a function $$Bk'=Bk^\gamma$$

A numerical value set in its numerical value field is set as a γ value, and is used as the black amount adjustment function 2113 in the black amount adjustment unit 2104.

This GUI example also comprises a "free set" button 2303. Upon selection of this button, a black amount adjustment curve panel 2304 is displayed. On this panel 2304, the function form of the black amount adjustment function 2113 can be arbitrarily set as a free curve 2305. For example, as shown in FIG. 26, the user drags two predetermined marks on the graph that represents the function to arbitrary positions, and the origin and upper right point of the graph and these marks are coupled by a predetermined method (spline function or the like), thus setting a free curve 2305.

When the user arbitrarily sets the curve 2305 and then presses an OK button on the panel 2304, the set curve is set as the black amount adjustment function 2113. In this manner, when an arbitrary curve is set as the black amount adjustment function 2113, the black amount adjustment operation in step S31 is made using an LUT.

Note that "set gamma" 2302 and "free set" 2303 can be exclusively designated using check buttons. When one setup is designated, the other setup is grayed out, and the user can easily recognize the selected state.

Also, a recommended value of the black amount adjustment function 2113 may be set in correspondence with the type of device set in the device recommended value setting field 1511.

As described above, according to the seventh embodiment, black amount adjustment can be made while maintaining the set total toner amount. Hence, more flexible color separation can be attained, and the profiles of an output device can be generated more appropriately.

Eighth Embodiment

The CMYK color space converted by the device RGB→CMYK converter 1411 described in the above embodiment depends on an output device. The CMYK color space is defined by C, M, Y, and K color components corresponding to the types of color agents that the output device uses. The tone characteristics and a printer model formed often largely vary depending on an output device, and such variations may disturb Lab→device RGB conversion explained in the first embodiment.

Figure 27:
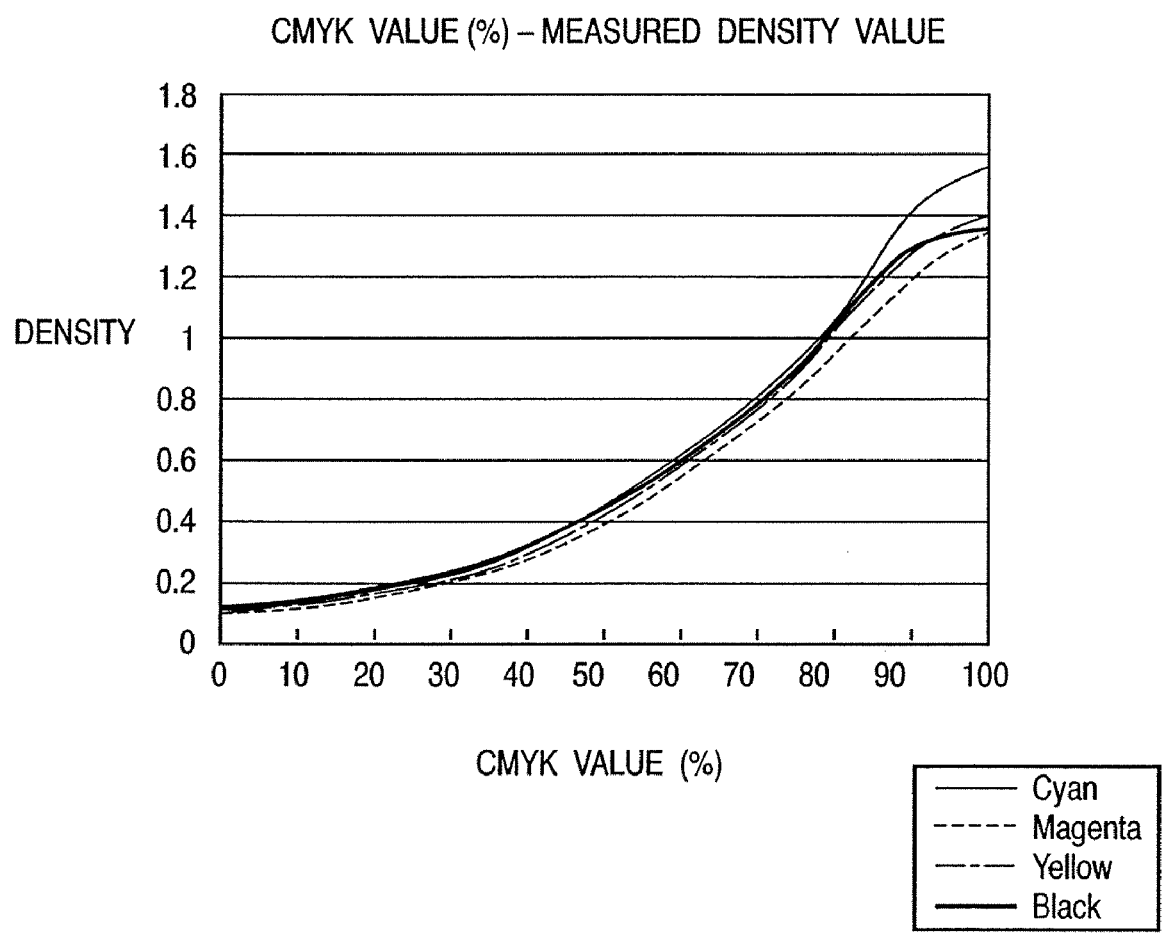
FIG. 27 is a graph showing an example of the CMYK value-density characteristics of an output device.

FIG. 27 shows an example of Response Curves (the relationship between the CMYK value (%) and density) with respect to a CMYK input, i.e., the tone characteristics of C, M, Y, and K colors. The output of a printing press often has the tone characteristics shown in FIG. 27. Also, a system that simulates print tones by independently executing linear LUT conversion for each of C, M, Y, and K colors is available.

Figure 28:
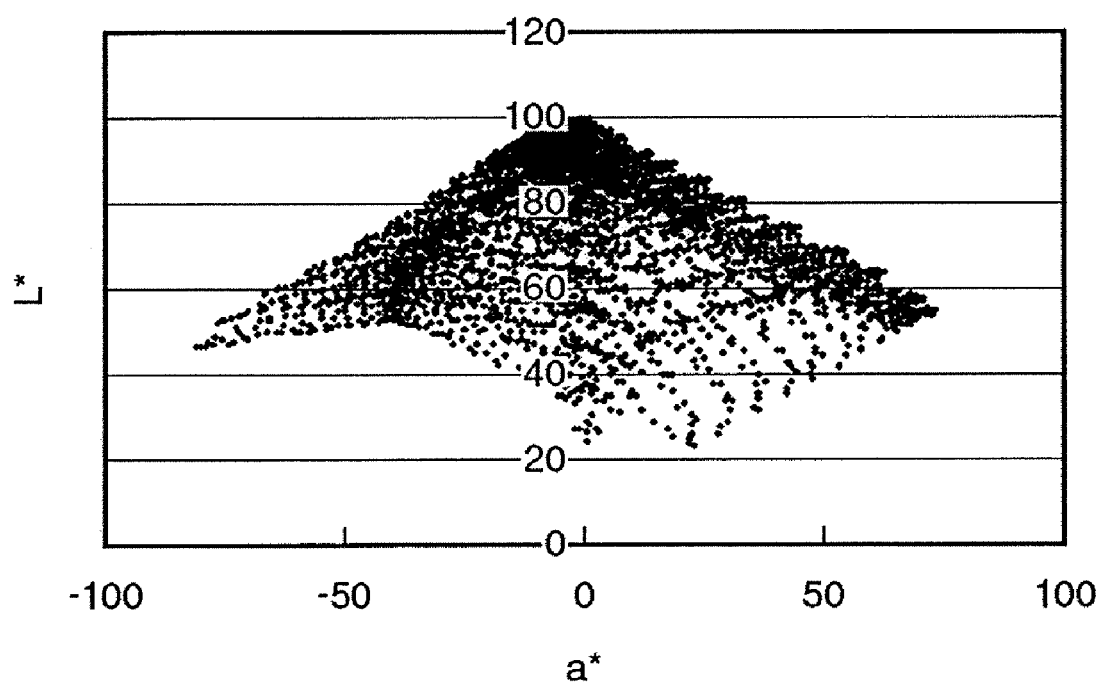
FIG. 28 shows a printer model example of the output device shown in FIG. 27.

When Lab values obtained by a device RGB→Lab conversion LUT of a printer model using the method explained in the above embodiment are plotted in association with the output device having the tone characteristics shown in FIG. 27, FIG. 28 is obtained. Also, when Lab values are similarly plotted in association with an output device having linear tone characteristics of the relationship (Response curves) between the CMYK value (%) and density, FIG. 29 is obtained.

Note that the device RGB→Lab conversion LUT of the printer model is generated by device RGB→CMYK conversion output from the output device, and CMYK→Lab conversion according to the colorimetric result of CMYK color patches, as has been explained in each of the above embodiments (e.g., FIG. 15B).

Figure 29:
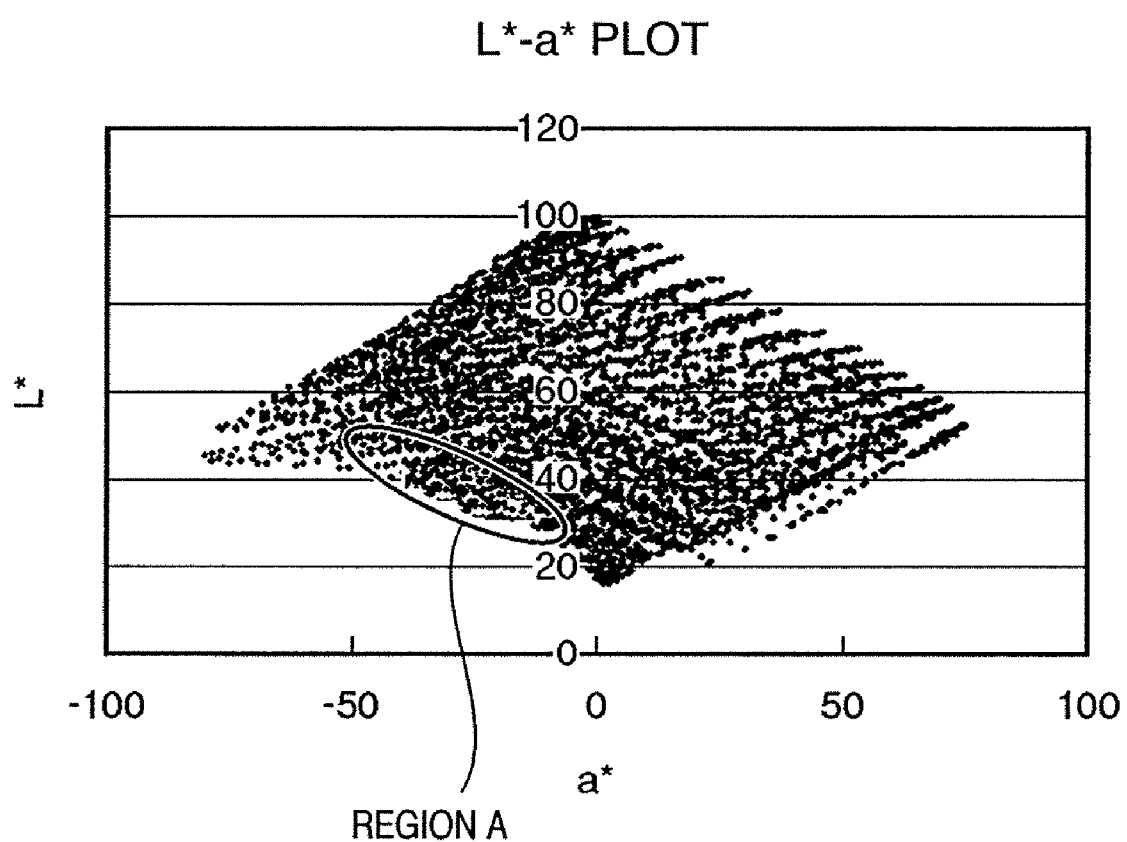
FIG. 29 shows an example of a printer model obtained by an output device with linear CMYK-density characteristics.

As can be seen from a comparison between FIGS. 28 and 29, the volumes of color cubes in a region of small L* values are different. In the color cube (FIG. 28) of the output device having nonlinear tone characteristics, colors in region "A" get inside the color cube compared to the color cube (FIG. 29) of the output device having linear tone characteristics. That is, color in region "A" that the printer model of the output device having linear tone characteristics can output cannot be output by the printer model of the output device having nonlinear tone characteristics.

In the eighth embodiment, a modification of device RGB→CMYK conversion explained in the above embodiment will be explained to generate a printer model from the colorimetric values of output color patches so as to obtain Lab→device RGB conversion more satisfactorily.

In the following description, a CMYK color space in which CMYK values have linear characteristics with respect to the density is considered as a standard color space, and a method of obtaining device RGB→CMYK conversion for outputting the color values of that color space will be explained.

Figure 30:
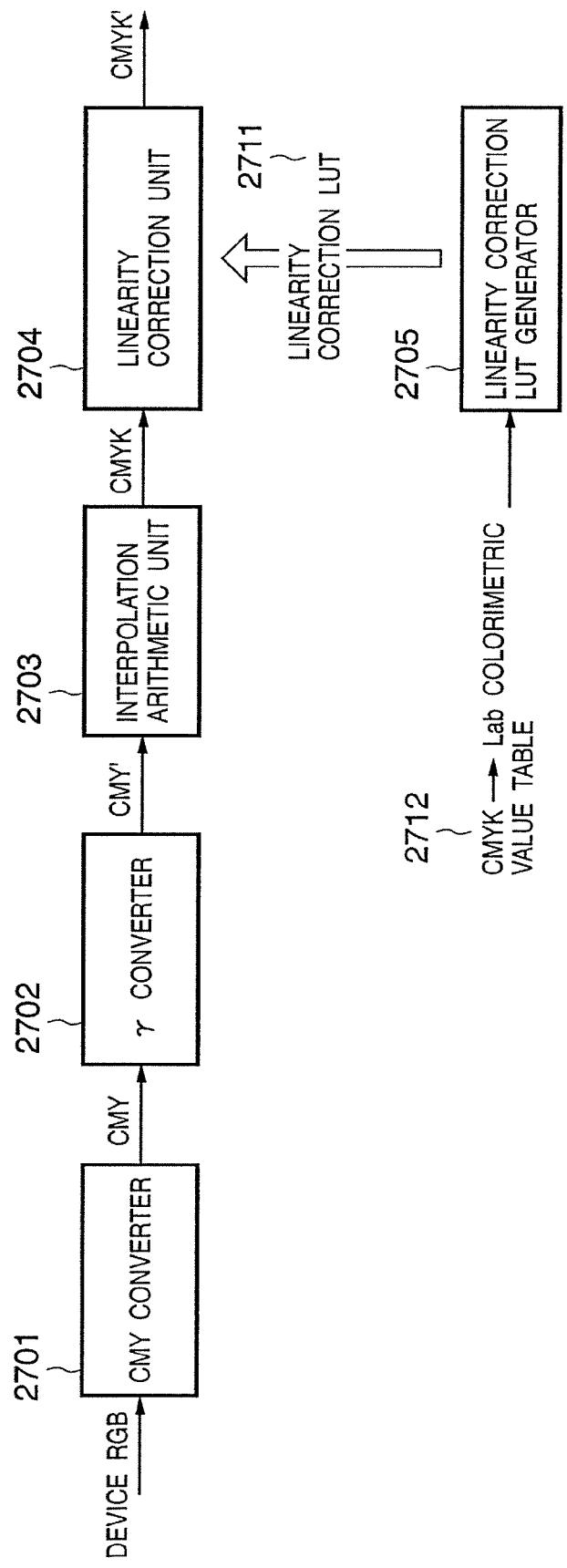
FIG. 30 is a block diagram showing an example of the arrangement of a device RGB→CMYK converter according to the eighth embodiment.

FIG. 30 is a block diagram showing an example of the arrangement of a device RGB→CMYK converter of the eighth embodiment.

An input device RGB value is converted into a CMYK value via processes of a CMY converter 2701, γ-converter 2702, and interpolation arithmetic unit 2703, as in the fourth embodiment. In the eighth embodiment, a linearity correction unit 2704 then makes conversion into a CMYK color space which is linear with respect to the density.

The linearity correction unit 2704 comprises linear LUT conversion independent for each of C, M, Y, and K colors. A linearity correction LUT 2711 is generated by a linearity correction LUT generator 2705 based on a CMYK→Lab colorimetric value table 2712 as the colorimetric values of CMYK color patches. As the device RGB→CMYK converter, the process in the seventh embodiment can be applied, and the black amount adjustment unit can be used together.

Figure 31:
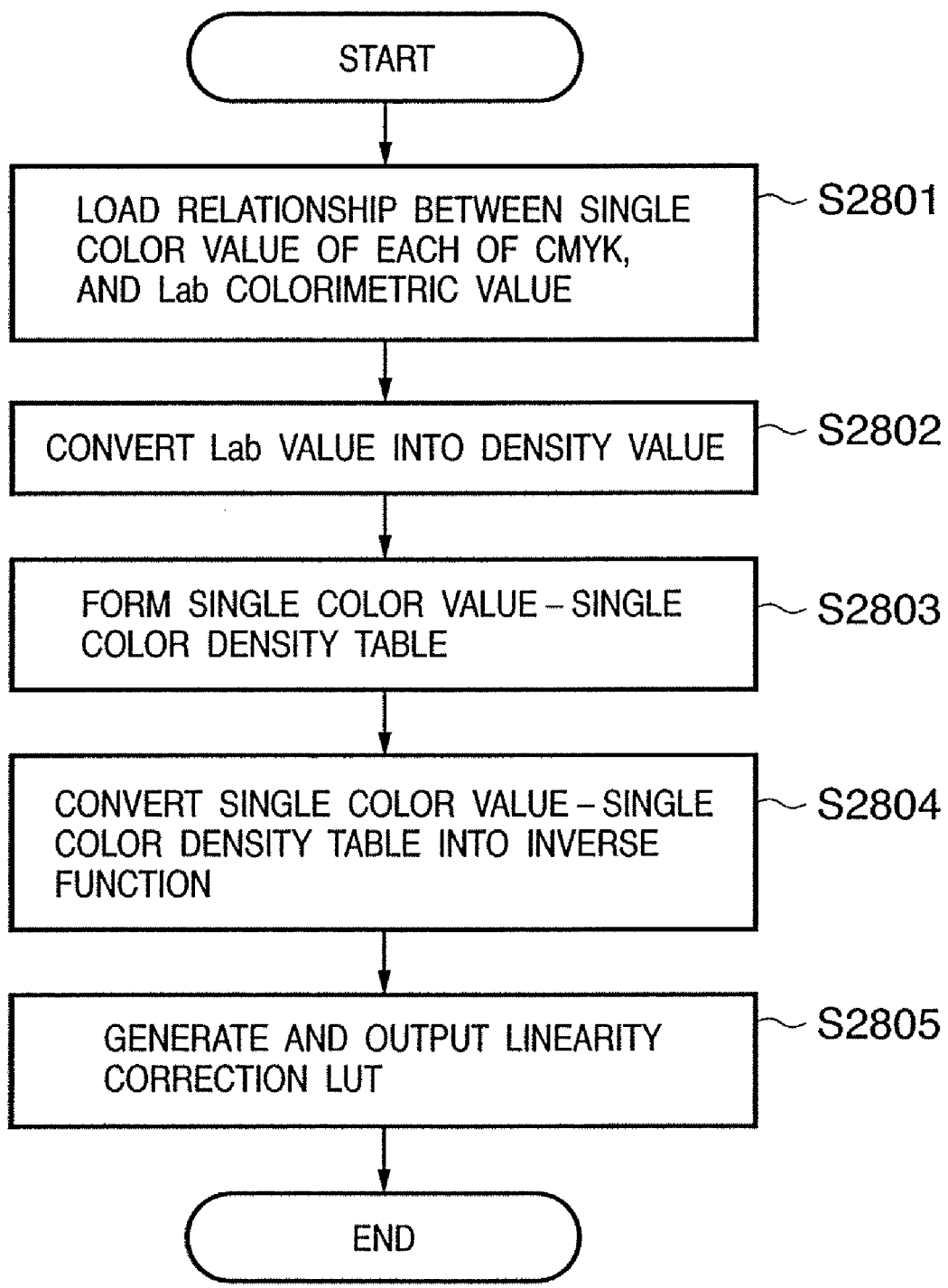
FIG. 31 is flow chart showing the flow of the process of a linearity correction LUT generator.

FIG. 31 is a flow chart for explaining the process of the linearity correction LUT generator 2705.

When a linearity correction LUT generation process starts, Lab colorimetric values corresponding to a single color of C, M, Y, and K are loaded for respective C, M, Y, and K colors from the CMYK Lab colorimetric value table 2712 (S2801). For example, when colorimetric values corresponding to C single color are loaded, "colorimetric value of C single color patch" can be extracted and loaded from "colorimetric value of color patch image" in the table below.

Colorimetric Value of Color Patch Image
6 C M Y K 0 0 0 0 32 0 0 0 64 0 0 0 . . . 224 255 255 255 255 255 255

Colorimetric Value of C Single Color Patch
7 C M Y K 0 0 0 0 32 0 0 0 64 0 0 0 . . . 224 0 0 0 255 0 0 0

A similar loading process is executed for the remaining M, Y, and K to obtain four correspondences C-Lab, M-Lab, Y-Lab, and K-Lab. In the subsequent process, four linearity correction LUTs 2711 are obtained from these four correspondences. However, only a method of generating a linearity correction LUT for C single color will be explained for the sake of simplicity. The remaining M, Y, and K single colors undergo the same process as that for C single color to generate linear LUTs.

Density values are estimated from the loaded Lab values (S2802). In the eighth embodiment, the Lab values of C single color patches are converted into C density values using an Lab→density LUT obtained in advance, and a known interpolation operation method.

An example of the Lab→density LUT generation method will be explained. Lab values of CMYK color patches are measured, and density values are also measured. The Lab→density LUT corresponding to C is generated by generating an Labdensity correspondence table based on the Lab colorimetric values and density values of C single color patches, and making an interpolation operation of density values corresponding to Lab values set at equal intervals. The same process is done for M, Y, and K to generate Lab→density LUTs.

Figure 32:
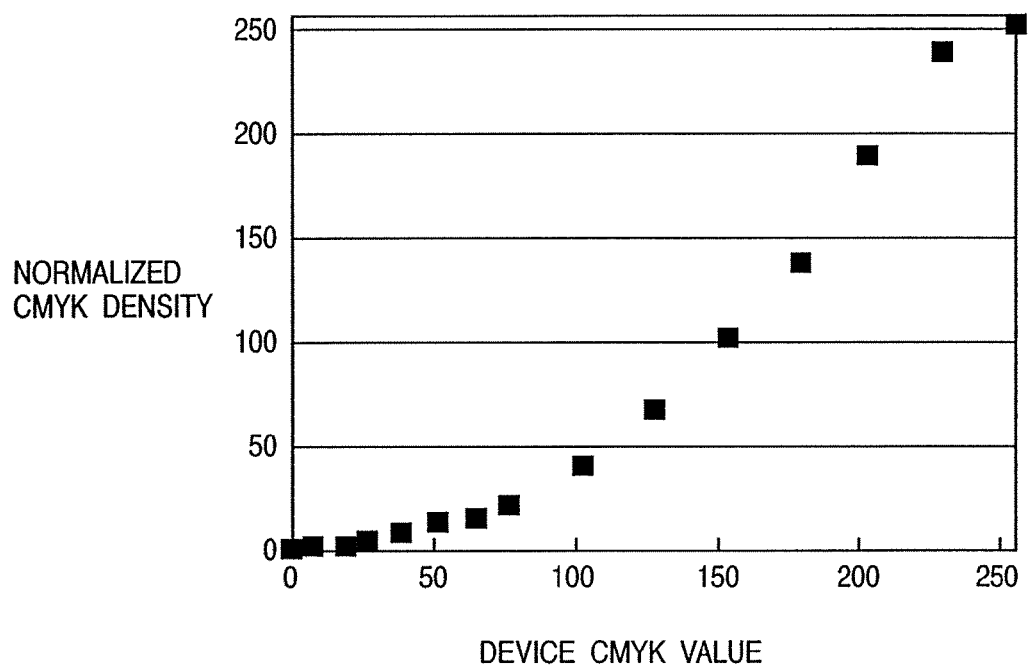
FIG. 32 shows an example of a CMYK single color value-CMYK single color density table.

Since the C density values obtained in step S2802 are obtained from Lab values corresponding to C single color patches, they are combined with the values of the C single color patches to obtain a C single color value-C density value correspondence. Furthermore, this correspondence is normalized to obtain a C single color value-C density value table (S2803). FIG. 32 shows this table.

Figure 33:
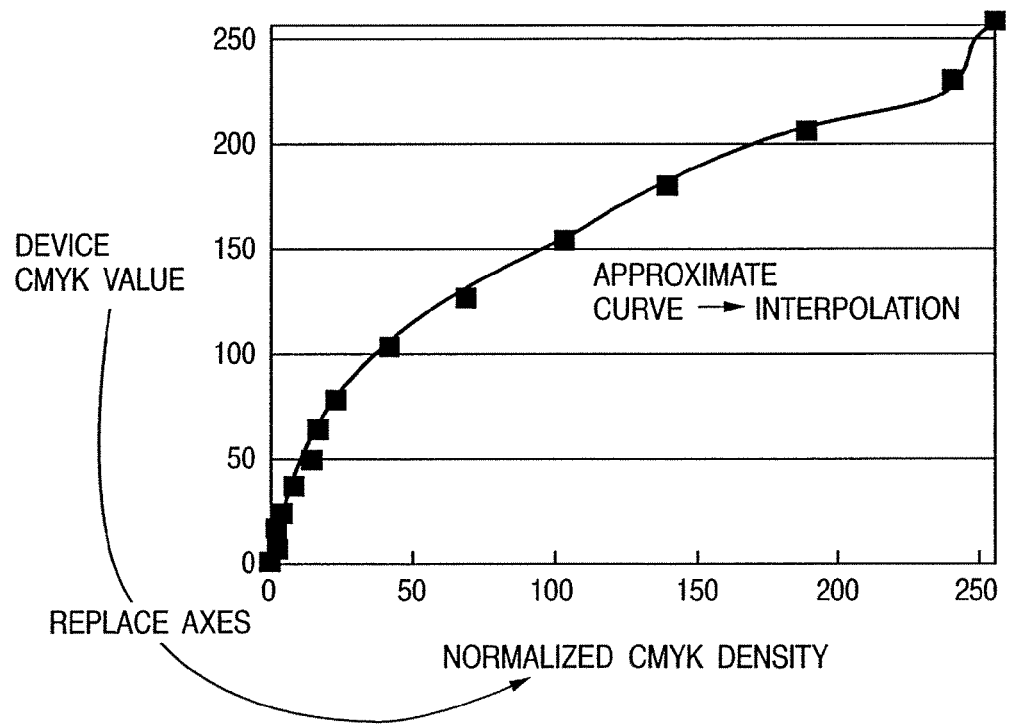
FIG. 33 is a graph for explaining a linearity correction LUT.

Then, an inverse function of the C single color value-C density value table is obtained (S2804). Since conversion for converting the relationship between the C single color values and C density values into a linear relationship is done, an inverse function can be formed by replacing the correspondence between the C single color values and C density values. FIG. 33 shows this correspondence.

Subsequently, an approximate curve of the correspondence shown in FIG. 33 is obtained, and an interpolation operation is made to generate and output a linearity correction LUT (S2805), thus ending the process.

In the above example, the density values are estimated from the Lab values by an interpolation operation using the Lab-density table obtained in advance in consideration of a situation that only Lab colorimetric values are available. However, in a situation that density values can be directly measured, the density values of CMYK patches may be directly measured. In such case, the measured density values have higher accuracy, and correction accuracy can be improved.

According to the eighth embodiment, since a printer model is formed by converting CMYK values to change linearly with respect to the density, the color space conversion accuracy in a device-independent color space can be improved, and accurate color profiles can be generated independently of the characteristics of an output device.

Even for an output device having nonlinear tone characteristics, a printer model that reflects characteristics which can output, e.g., region "A" shown in FIG. 29, i.e., satisfactorily reflects a color cube that an output device can output, can be generated. Therefore, a device RGB→Lab conversion table and Lab→CMYK conversion LUT can be satisfactorily generated from the printer model.

Other Embodiments

In the description of the above embodiments, a CMYK printer is used. However, other print agents (e.g., six color inks including C, M, Y, K, light C, and light M, or the like) may be used.

Also, in the description of the above embodiments, the RGB→CMYK conversion process is used. In place of device RGB, three color components such as C, M, and Y that do not include a black component may be used. As can be seen from the relation between RGB and CMY in the process executed by the CMY converter 2101, CMY can be used in place of RGB.

Device-independent color data is not limited to Lab data, and other color data such as Luv, XYZ, and the like may be used.

Furthermore, in the description of the above embodiments, the output device uses four, i.e., C, M, Y, and K color agents. Alternatively, an output device which uses six color agents that include light C and light M in addition to C, M, Y, and K may be used.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, a profile that can accurately approximate strong nonlinear output characteristics of a color printer or printing press, and allows accurate color reproduction can be provided.

Also, in a color printer that forms an image using a K color agent, a black plate can be flexibly adjusted while maintaining accurate color reproduction.

Furthermore, a conversion table that can absorb characteristic differences for respective color printers, and can implement accurate color reproduction in various color printers can be generated.

Therefore, since color space conversion that well reflects the printer characteristics can be done in a device-independent color space, accurate printer color reproduction can be made irrespective of input color spaces. Also, since color separation suitable for the characteristics of an output device can be easily made, the color space conversion accuracy in a device-independent color space can be further improved.

The present invention is not limited to the above embodiments and various changes and modifications can be made within the spirit and scope of the present invention. Therefore, to apprise the public of the scope of the present invention, the following claims are made.

What is claimed is:

1. An image processing method of generating a printer model used to convert device-dependent data into device-independent data, on the basis of colorimetric results of color patches output from an output device, and generating a conversion table used to convert the device-independent data into the device-dependent data, on the basis of the printer model, comprising the steps of:

obtaining tone characteristics of the output device based on the density of a single color patch which is estimated using a device-independent colorimetric value corresponding to the single color patch in a CMYK-device-independent colorimetric value table obtained from the colorimetric results, and calculating a conversion condition used to convert the tone characteristics into linear characteristics; and generating the printer model used for generating the conversion table, on the basis of a CMYK value obtained by converting the tone characteristics into the linear characteristics and on the basis of the CMYK-device-independent colorimetric value table obtained from the colorimetric results used for obtaining the tone characteristics.

2. The method according to claim 1, wherein the printer model is a conversion table used to convert device-dependent three color component data into the device-independent data, and further comprising a conversion process for converting the device-dependent three color component data into CMYK data which correspond to color agents of the output device and are more than three, wherein the conversion condition is a plurality of linear lookup tables respectively corresponding to each color component of the CMYK data, and wherein the tone conversion process executes tone conversion independently using the linear lookup table for each of the plurality of color component data.

3. The method according to claim 2, wherein said conversion condition calculation step includes calculating the conversion condition on the basis of colorimetric results of color patches output using one color agent of the output device.

4. The method according to claim 2, further comprising the step of executing a gamma conversion process for the device-dependent three color component data.

5. The method according to claim 2, wherein said color component conversion process executes conversion according to total amount limitation of the color agents.

6. The method according to claim 2, wherein the plurality of color components which correspond to the color agents of the output device and are more than three include a black component, and further comprising the step of:

executing black amount adjustment of the CMYK data converted by the color component conversion process in accordance with a user's instruction.

7. An image processing apparatus for generating a printer model used to convert device-dependent data into device-independent data, on the basis of colorimetric results of color patches output from an output device, and generating a conversion table used to convert the device-independent data into the device-dependent data, on the basis of the printer model, comprising:

calculation means for obtaining tone characteristics of the output device based on the density of a single color patch which is estimated using device-independent colorimetric value corresponding to the single color patch in a CMYK-device-independent colorimetric value table obtained from the colorimetric results, and calculating a conversion condition used to convert the tone characteristics into linear characteristics; and generation means for generating the printer model used for generating the conversion table, on the basis of a CMYK value obtained by converting the tone characteristics into the linear characteristics and on the basis of the CMYK-device-independent colorimetric value table obtained from the colorimetric results used for obtaining the tone characteristics.

8. A computer-readable storage medium storing a computer-executable program for causing a computer to perform an image processing method of generating a printer model used to convert device-dependent data into device-independent data, on the basis of colorimetric results of color patches output from an output device, and generating a conversion table used to convert the device-independent data into the device-dependent data, on the basis of the printer model, the method comprising the steps of:

obtaining tone characteristics of the output device based on the density of a single color patch which is estimated using a device-independent colorimetric value corresponding to the single color patch in a CMYK-device-independent colorimetric value table obtained from the colorimetric results, and calculating a conversion condition used to convert the tone characteristics into linear characteristics; and generating the printer model used for generating the conversion table, on the basis of a CMYK value obtained by converting the tone characteristics into the linear characteristics and on the basis of the CMYK-device-independent colorimetric value table obtained from the colorimetric results used for obtaining the tone characteristics.

* * * * *